United States Patent [19]
Tomita et al.
[11] Patent Number: 4,864,551
[45] Date of Patent: Sep. 5, 1989

[54] MULTI-DISK PLAYER SYSTEM

[75] Inventors: Nobumitsu Tomita; Akira Takahashi; Shogo Takeuchi, all of Saitama, Japan

[73] Assignee: Pioneer Electronic Corporation, Tokyo, Japan

[21] Appl. No.: 915,352

[22] Filed: Oct. 6, 1986

[30] Foreign Application Priority Data

Oct. 7, 1985 [JP] Japan ............................... 60-223267

[51] Int. Cl.[4] ...................... G11B 17/22; G11B 19/10; G11B 33/04

[52] U.S. Cl. ....................................... 369/36; 369/270

[58] Field of Search ...................... 369/36, 38, 39, 270

[56] References Cited

U.S. PATENT DOCUMENTS 4,509,157 4/1985 Morinoga ............................ 369/270
4,679,866 6/1987 Hasegawa et al. .................. 369/39
4,730,292 3/1988 Hasegawa et al. .................. 369/36

FOREIGN PATENT DOCUMENTS 94272 5/1984 Japan .................................... 369/36
61-261853 11/1986 Japan .

*Primary Examiner*—Steven L. Stephan
*Attorney, Agent, or Firm*—Sughrue, Mion, Zinn, Macpeak & Seas

[57] ABSTRACT

A disk player is disclosed which includes a player housing, a turntable installed in the player housing, a disk holder for holding disks and for being inserted and installed in installation mechanism within the player housing, and disk-unloading/conveying mechanism for conveying the disk in the disk holder to a playback position. The disk holder has a housing, plate-shaped trays that can be contained in and ejected from the housing along each principal surface relative to the housing, and a press member for performing a disk clamp action in cooperation with the turntable by abutting against a face of the disk. The face is opposite to what faces said turntable. The press member is provided with a projection projecting upward for being fitted into the center hole of the disk.

4 Claims, 21 Drawing Sheets

MULTI-DISK PLAYER SYSTEM

BACKGROUND OF THE INVENTION

The present invention relates to a multi-disk player system, and more particularly to a multi-disk player capable of containing a plurality of disks and successively selecting any one of the disks and continuously playing them back.

There is known a jukebox used as a multi-disk player system that is capable of accommodating a plurality of disks and which enables continuous playing of music on a series of randomly selected disks. The jukebox may be regarded as a common type of multi-disk player, but the conventional jukebox is contained within a very large cabinet and is not suitable for use at home.

With the recent advance in digital recording technology, several types of digital audio disks (hereinafter abbreviated as DAD) have been developed and are in extensive use. Compared with the conventional analog audio disks, DADs feature an increased information capacity and a reduced noise problem during reproduction. Small-sized DADs (o.d. of about 12 cm) are commonly referred to as compact disks which are adapted to have signals written and read thereon by a laser beam; compact disks are simple to use and enable reduction in the overall size of the disk player. Making use of these features of small-sized DADs, audio makers have recently developed a multi-disk player which is ideal as a home jukebox and which is capable of continuous playing of a plurality of (typically 5 or 6) compact disks It is worth noting that a single compact disk can play approximately one hour, which is equivalent to about 1.5 times the information capacity of the conventional analog audio disk. This means that 6 compact disks have a capacity of about 120 pieces of music assuming that each piece continues for a period of 3 minutes on average, and as a result, the listener can make his own music library containing favorite pieces in magazines classified by genre such as jazz, chanson or classics A multidisk player basically comprises a playback means including a turntable and a pickup, a disk holder for holding disks and for being inserted and fitted in a loading means within a player housing, and a disk-unloading/conveying mechanism for conveying a disk loaded on the disk holder to a playback position, i.e., onto the turntable.

When a disk is conveyed onto the turntable in the disk holder in such a multidisk player, the disk is normally moved in two directions parallel and roughly perpendicular to the disk-holding face of the turntable. In the multidisk player already developed, however, the above disk-unloading/conveying mechanism for the disk conveyance is so operated as to directly hold the disk end at the disk-ejecting side or hold the whole body thereof and eject it from the disk holder. Since the disk-unloading/conveying mechanism, to say nothing of the disk-holding mechanism, is not only complicated but also large in size and further requires a large space for operation, it has been difficult to make compact the player as a whole and to prevent or increase in cost.

In a multidisk player newly developed to solve the above problems disclosed by Japanese Patent Application No. 104303/85 (not prior art within a meaning of 35 USC 102), the disk holder includes a housing and a plurality of plate-shaped trays, each being capable of holding the disk on its principal face and of being ejected from or retracted in the housing along the principal face. In other words, by simply ejecting each plate-like tray loaded with the disk from the housing, the disk is conveyed in one direction (parallel to the disk-holding face of the turntable). Accordingly, this multidisk player is simpler in construction than what is equipped with the disk-unloading/conveying mechanism for directly ejecting the disk out of the disk holder by holding the end of the disk in the disk-ejecting direction or the whole body thereof with the complicated mechanism so that the described type of multi-disk player can readily be made compact and less costly.

The disk-unloading/conveying mechanism for bidirectionally conveying the disk includes a tray ejector for ejecting the tray loaded with a disk for being played back from the housing of the disk holder and a disk shifter for shifting the disk loaded on the tray ejected out of the housing in the direction roughly perpendicular to the disk-holding face of the turntable. The disk shifter comprises a press member for clamping a disk in cooperation with the turntable by abutting against the face of the disk ejected out of the housing together with tray by the tray ejector (the face of the clamped disk being opposite to what faces the turntable), a support installed movably within a plane roughly perpendicular to the disk-holding face of the turntable and used to rotatably support the press member, and a driving force application means for driving the support. In other words, the disk shifter means is simultaneously used as a clamp mechanism for shifting the disk in the direction roughly perpendicular to the disk-holding face of the turntable, whereby the disk is lifted by the press member and the support before the disk is shifted.

The multidisk player already developed is roughly thus constructed. However, the disk is unstably shifted by the clamp mechanism and, when certain external force is applied to the disk being shifted, the disk may shift in the radial direction, thus causing a so-called miss clamp.

SUMMARY OF THE INVENTION

The present invention is intended to solve the above problems and it is therefore an object of the invention to provide an inexpensive compact multidisk player free from occurrence of miss clamp because a disk is stably conveyed in the direction roughly perpendicular to the disk-holding face of a turntable.

The multidisk player according to the present invention is characterized by a press member forming a clamp mechanism to perform a disk clamp action in cooperation with a turntable by abutting against the face of the disk, that face being opposite to what faces the turntable. The press member has a projection fitted into the center hole of the disk.

DETAILED DESCRIPTION OF THE PREFERRED EMBODIMENTS

Figure 1:
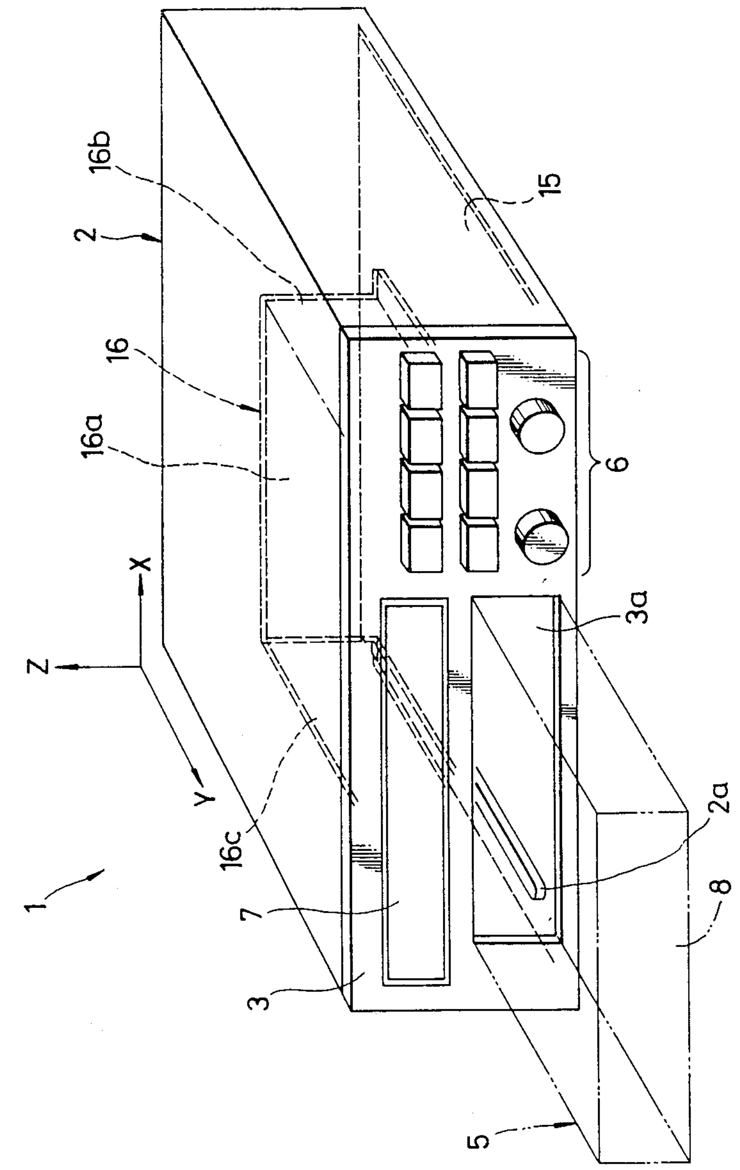
FIG. 1 is a perspective view of the whole body of a multidisk player embodying the present invention.
Figure 2A:
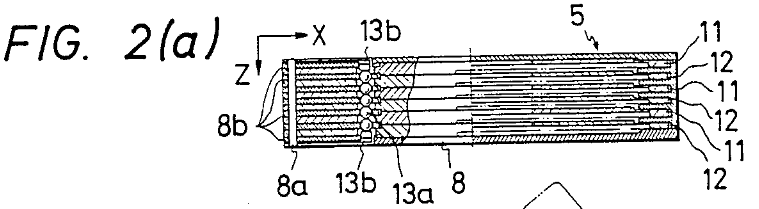
FIGS. 2(*a*) through 5(*b*) are diagrams illustrating a magazine.
Figure 2C:
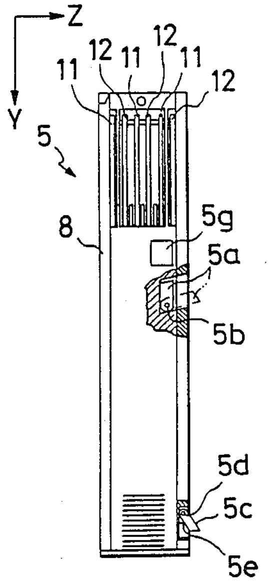
Figure 2B:
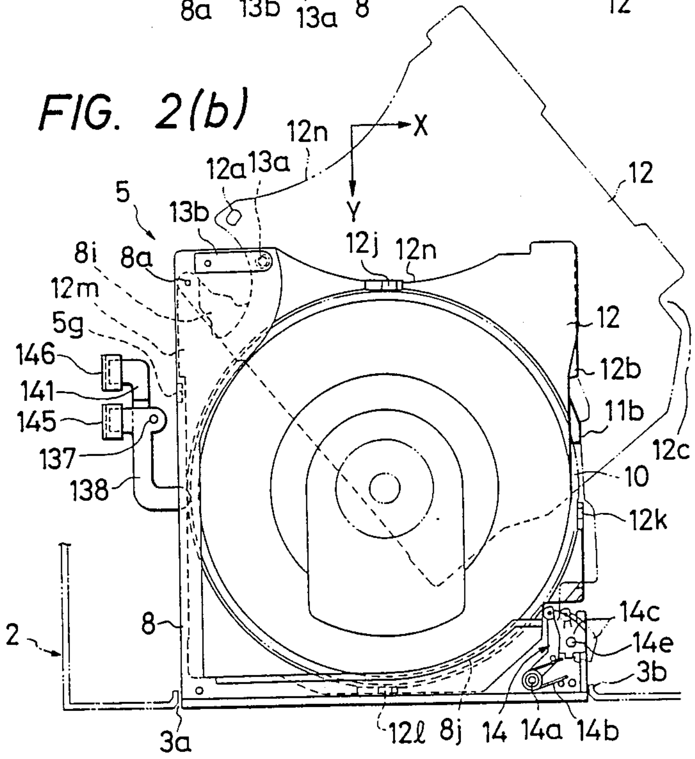
Figure 2D:
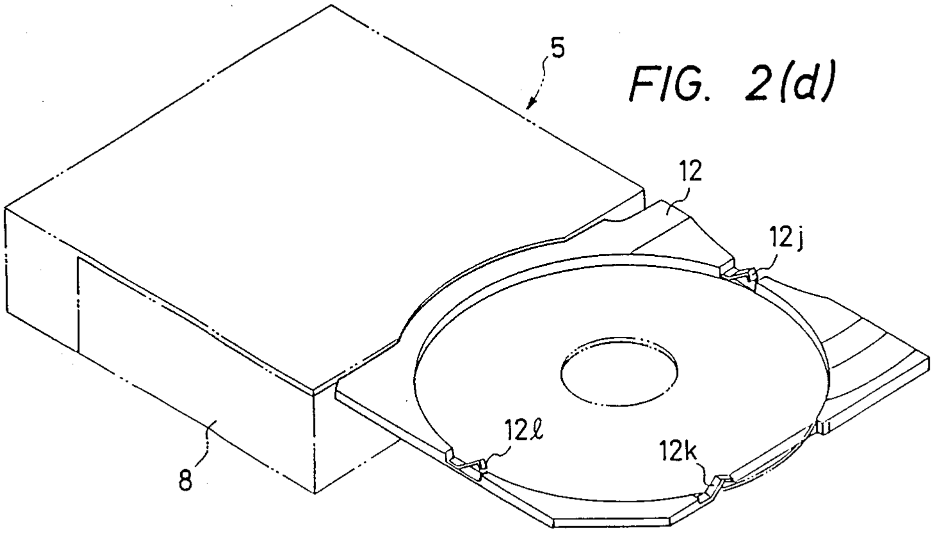

Referring now to the accompanying drawings, a description will be given of a multidisk player incorporating a disk holder embodying the present invention.

In the drawings, reference numeral 1 indicates the whole body of the multidisk player.

As shown in FIG. 1, the front panel 3 of a player housing 2 is provided with a rectangular opening 3*a* for accommodating a magazine 5 as a disk holder within the housing. The opening 3*a* extends both rightward and leftward with respect to the forward direction indicated by the arrow Y, and the left-ward direction is indicated by the arrow X. The arrow Z indicates the upward direction. The front panel 3 is also provided with a group of control buttons 6 for manipulating the multidisk player, and is also provided with a display 7.

As shown in FIGS. 2(*a*) to 2(*c*), the magazine 5 is composed of a generally flat parallelepiped body 8 as a housing, and has two sets of three trays A and B, in the form of a rectangular plate, each carrying a disk 10 on its major surface. The set of A trays 11, the set of B trays 12 and, hence, the disks 10 are accommodated in an orderly fashion at a given pitch in a direction perpendicular to the disk-carrying face of a turntable (to be described hereinafter), or in this case in the vertical direction (both in the direction indicated by the arrow Z and in the opposite direction). Each of the A trays 11 and B trays 12 is rotate at its corner about a shaft 8*a* that extends through the magazine body 8 at its right rear end in the vertical direction (in which the trays are stacked). Each tray 11 or 12 is capable of moving along its major surface such that it is accommodated within or projects from the magazine body 8.

The construction of a magazine 5 will be described in more detail.

Figure 3A:
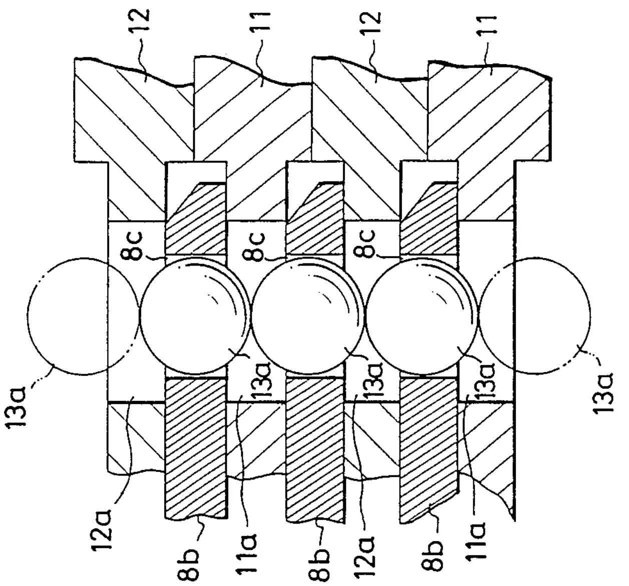
Figure 3B:
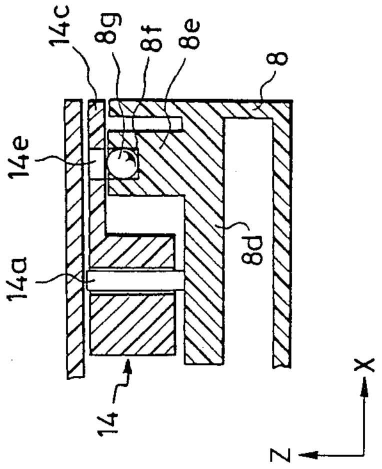
Figure 3C:
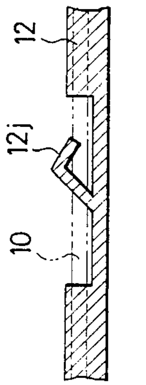
Figures 4A, 4B:
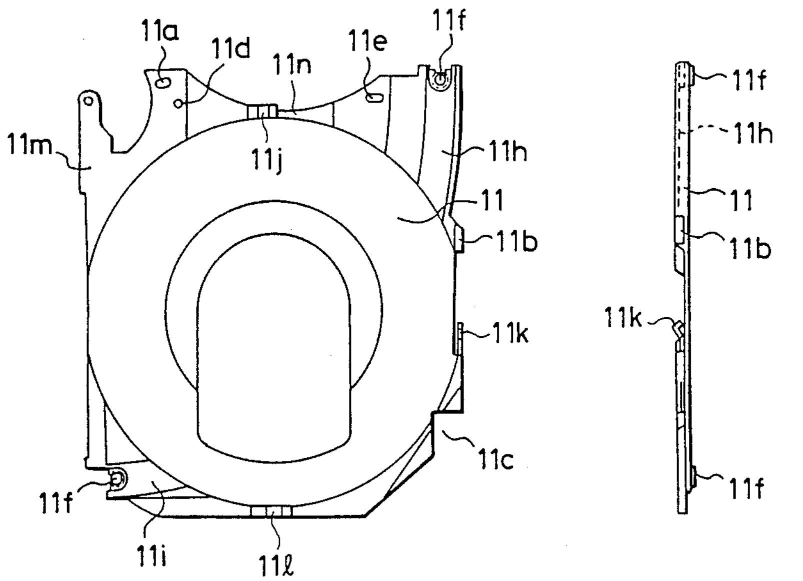
Figures 5A, 5B:
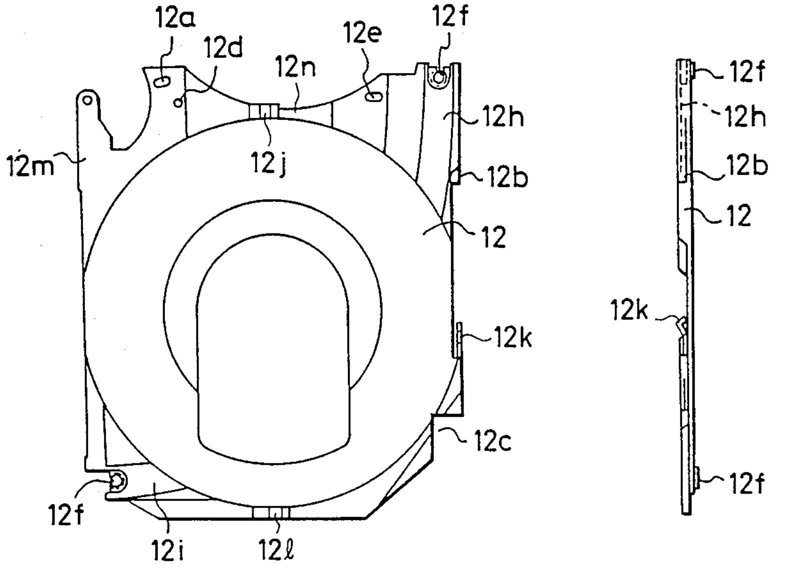

Seven partitions 8*b* are vertically (in the directions of the arrow Z and opposite thereto) lined up in a magazine body 8 and the trays 11 and 12 are arranged with the partitions 8*b* sandwiched therebetween. As shown in FIG. 3(*a*), each partition 8*b* is provided with a circular concentric small opening 8*c* close to the rotations-supporting shaft 8*a*. FIGS. 4(*a*), (*b*) and FIGS. 5 (*a*), (*b*) show the trays 11 and 12 in detail. As shown in both drawings, the trays are provided with openings 11*a*, 12*a* capable of facing the openings 8*c* formed in the partitions 8*b*, respectively. The openings 8*c* formed in the partition 8*b* are called a first opening, whereas those 11*a*, 12*a* formed in the trays 11, 12 are called a second opening. Five spherical balls 13*a* are respectively fitted into the openings 8*c*, 11*a*, 12*a* in such a manner that they are movable along the direction (in the directions of an arrow Z and opposite thereto) in which the partitions 8*b* are arranged in parallel. The diameter of each spherical balls 13*a* is equal to the pitch dimension of the trays 11, 12 alteratively arranged. Moreover, the balls 13*a* are energized by a pair of leaf springs 13*b* arranged at upper and lower ends of the magazine body 8 so as to move toward each other.

As shown in FIG. 2(*b*), a press lever 14 extending in the roughly longitudinal direction (in the direction of the arrow Y and opposite thereto) is installed at the left end of the magazine body 8 and one end of the press lever 14, i.e., its front end, is attached to the magazine body 8 through a pin 14*a* so as to freely rotate. In this case, the pin 14*a* extends vertically (in the directions of the arrow Z and opposite thereto). The other end of the press lever 14, i.e., its rear end, can smoothly mate with the free ends of each of the trays 11, 12. A torsion spring 14*b* engages with the press member 14 and is used to energize the press lever 14 counterclockwise in FIG. 2(*b*) to provide it with tray-pressing force. A projection 14*c* is formed on the press lever 14 and the projection 14*c* abuts against the edge 3*b* of the front opening 3*a* in the player housing when the magazine 5 is isolated from the magazine-loading means in the player housing 2. The projection 14*c* so functions as to rotate the body of the press lever 14 by abutting against the edge 3*b* of the opening 3*a* so that the trays 11, 12 are energized toward the containment position in the magazine body 8.

The press lever 14 and the torsion spring 14*b* constitute the press member for pressing the trays 11, 12 toward the containment position at the rotation-supporting shaft 8*a* in the magazine body 8. Moreover, the press member, the openings 8*c* (first opening) respectively formed in the partitions of the magazine body 8, the openings 11*a*, 12*a* (second openings) respectively formed in the trays 11, 12, the spherical balls 13*a* and the leaf springs 13*b* constitute the holding means for holding the trays 11, 12 in the containment position of the magazine body 8.

As shown in FIGS. 4(*a*), (*b*) and 5(*a*), (*b*), the trays 11, 12 are identical in shape excluding that claws 11*b*, 12*b* intended to be pulled by the finger of the listener when each tray is taken out of the magazine body 8. The claws 11*b*, 12*b* are different in shape and position. Cuts 11*c*, 12*c* with which the press lever 14 mate and pairs of jig-inserting holes 11*d*, 11*e* and 12*d*, 12*e* are formed in the free ends of the trays 11, 12, respectively.

Moreover, flexible spacers 11*f*, 11*f* made of synthetic leather are provided in fixed positions on the principal faces of adjoining trays, those faces being opposite to the disk-holding faces of the trays 11, 12 in such a manner as to project from the principal faces. The trays 11, 12 are provided with arcuate recesses 11*h*, 11*i*, 12*h*, 12*i* along the loci representing the movements of the flexible spacers 11*f*, 12*f* installed on the adjoining trays, respectively. The recesses 11*h*, 11*i*, 12*h*, 12*i* thus contribute to minimizing the vertical dimension of six levels of the piled up trays 11, 12. In other words, the magazine 5 as a whole can be made thinner.

As shown in FIGS. 2(*b*), (*d*), 3(*c*), 4(*a*), (*b*) and 5(*a*), (*b*), there are installed flexible slip-proof projections 11*j*, 11*k* 11*l* and 12*j*, 12*k*, 12*l* close to the faces respectively loaded with disks 11, 12. The projections mate with the magazine body 8 or adjoining tray and, when the tray is ejected out of the magazine body 8, project by a length greater than the thickness of the disk 10 from the disk holding faces in the direction (in the direction of an arrow Z) perpendicular to those faces.

As shown in FIG. 2(*c*), a mating claw 5*a* is provided roughly in the center of the right side of the magazine 5 and allowed to freely rotate within a fixed range about a pin 5*b* at one end of the magazine body 8. Another mating claw 5*c* is provided at the front end on the right side of the magazine 5 and allowed to freely rotate within a fixed range about a pin 5*d*. The free end of the mating claw 5*c* is externally biased by a coil spring 5*e*. The free ends of the mating claws 5*a*, 5*c* can mate with the edge 3*e* of the front opening 3*a* (see FIGS. 1 and 2(*b*)).

The mating claws 5a, 5c and the coil spring 5e constitute the loading check means for checking the loading of the magazine 5 in the loading means in the player housing 2 when the loaded position is improper. In other words, when the magazine 5 is loaded upside down on the loading means, the claw 5a rotates under its own weight and projects from the magazine 5, thus checking the loading of the magazine 5 as its free end thereof mates with the edge 3b of the above-described opening 3a. When the longitudinally inverted magazine 5 is installed in the installation means, the mating claw 5c outwardly projected by the coil spring 5e mates with the edge 3b of the opening 3a and checks the loading of the magazine 5.

Since the loading check means is constituted by simple members such as the mating claws 5a, 5c and the coil spring 5e, it is made simple in construction with cost reduction readily attainable.

As shown in FIGS. 2(*b*), 3(*b*), a circular opening 14e is formed in the projection 14c of the press lever 14 provided in the magazine 5 and allowed to freely rotate. On the other hand, as shown in FIG. 3(*b*), an overhang 8d extending along the underside of the press lever 14 is provided for the magazine body 8 as the housing of the magazine 5 and a pillar-shaped projection 8e is formed on the overhang 8d. A circular recess 8f is formed in the upper end of the projection 8d and a spherical ball 8g is inserted into the recess, the spherical ball being movable in the vertical direction (in the directions of the arrow Z and opposite thereto). The opening 14e formed in the projection 14c of the press lever 14 is able to face the recess 8f when the press lever is located in the position shown by a solid line of FIG. 2(*b*) and part of the spherical ball 8g is insertable into the opening 14e.

The press lever 14 and the moving piece 8g constitute the projection-regulating means for regulating the projection of the trays 11, 12 from the magazine body 8 when the magazine 5 as the disk holder is vertically inverted. In other words, when the magazine 5 is vertically inverted, the spherical ball 8g is moved by its own weight and part of it is inserted into the opening 14e of the press lever so as to regulate the rotation of the press lever 14 and thus the projection of the trays 11, 12 from the magazine body 8.

Since the projection-regulating means is constituted by members simple in shape such as the press lever 14 and the moving spherical ball 8g, it can be made simple in construction with cost reduction readily attainable. Moreover, what is sold on the market other than one especially prepared is usable as the spherical ball 8g.

As shown in FIG. 1, a chassis 16 as a support is fixed onto a bottom plate 15 fixedly installed within the housing 2. The chassis 16 consists of a flat side extending in the longitudinal direction (in the directions of the arrow Y and opposite thereto) and the transverse direction (in the directions of the arrow X and opposite thereto) and a pair of elevational sides 16b, 16c contiguous to both transverse ends of the flat side and extending in the longitudinal direction and vertical direction (in the directions of the arrow Z and opposite thereto, i.e., the direction in which each tray is arranged).

As shown in FIGS. 6 to 10, a moving member 18 is disposed between the rear ends of the pair of erect portions 16b and 16c in such a manner that it is movable in the vertical direction, or in the direction in which the trays 11 and 12 are stacked. Stated more specifically, the moving member 18 is composed of a resin movable chassis A 19 (see FIGS. 11(*a*) and 11(*b*) which is connected by, for example, screws to a steel tabular movable chassis B 20 (see FIG. 12) in such a manner that the movable chassis A 19 is fixed to the upper surface of the movable chassis B 20.

Figure 11A:
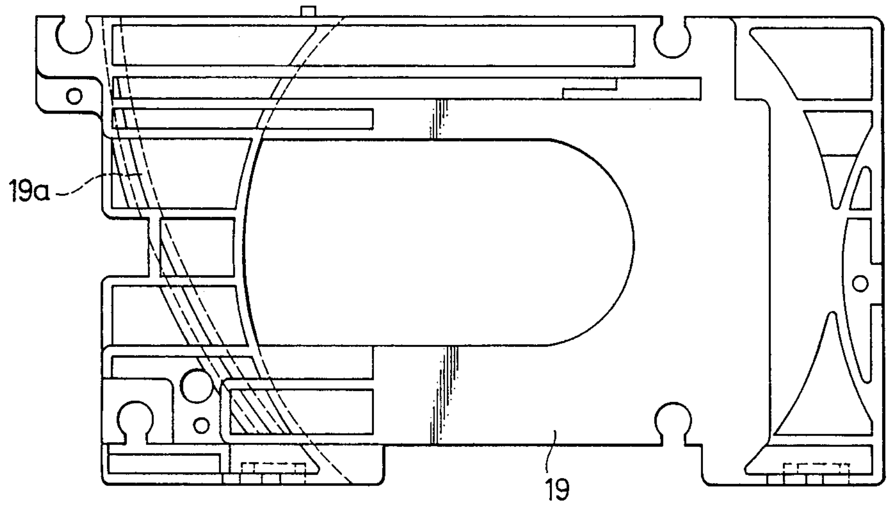
FIGS. 11(*a*) through 27 are partial detailed views of the internal construction.
Figure 11B:
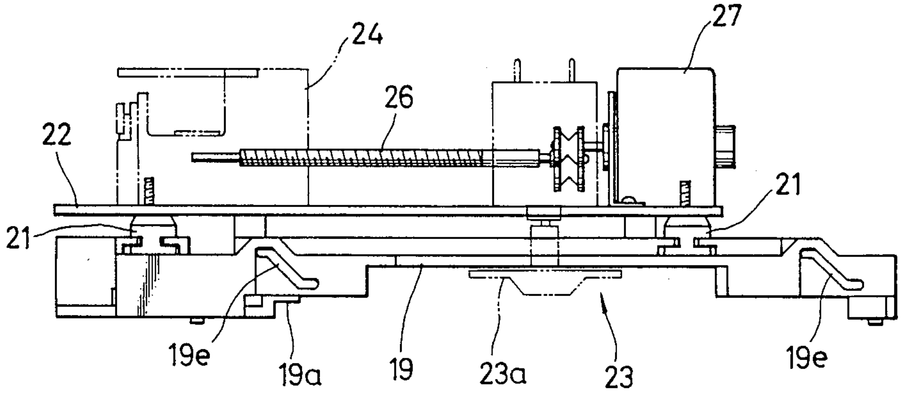

As is evident from FIG. 11(b), the upper surface of the resin movable chassis A 19 is provided with a carrier plate 22, with an anti-vibration member 21 (typically made of rubber) being inserted between the two members. A turntable 23 is mounted on the carrier plate 22. On the carrier plate 22 is also provided a carriage 24 bearing an optical pickup. This carriage 24 is mounted on the carrier plate 22 such that it is movable within a plane including the disk bearing surface 23a of the turntable 23 in leftward and rightward directions (the direction indicated by the arrow X and the opposite direction). The carrier plate 22 is also provided with a means for driving the carriage 24 that is essentially composed of a screw shaft 26 threaded into part of the carriage 24 and a motor 27 for imparting a rotational force to the screw shaft 26.

The turntable 23, the carriage 24 including the optical pickup means, and the carriage drive means combine together to form a means for playing disks. This playing means is carried on the moving member 18 and is caused to move together with the moving member 18 in the vertical direction (i.e., both in the direction indicated by the arrow Z and in the opposite direction).

As shown in FIGS. 11(*a*) and 11(*b*), the underside of the movable chassis A 19 is provided with an arched guide face 19a which is capable of making sliding contact with the rotating end of each of the trays 11 and 12 that projects from the magazine body 8.

Figure 12:
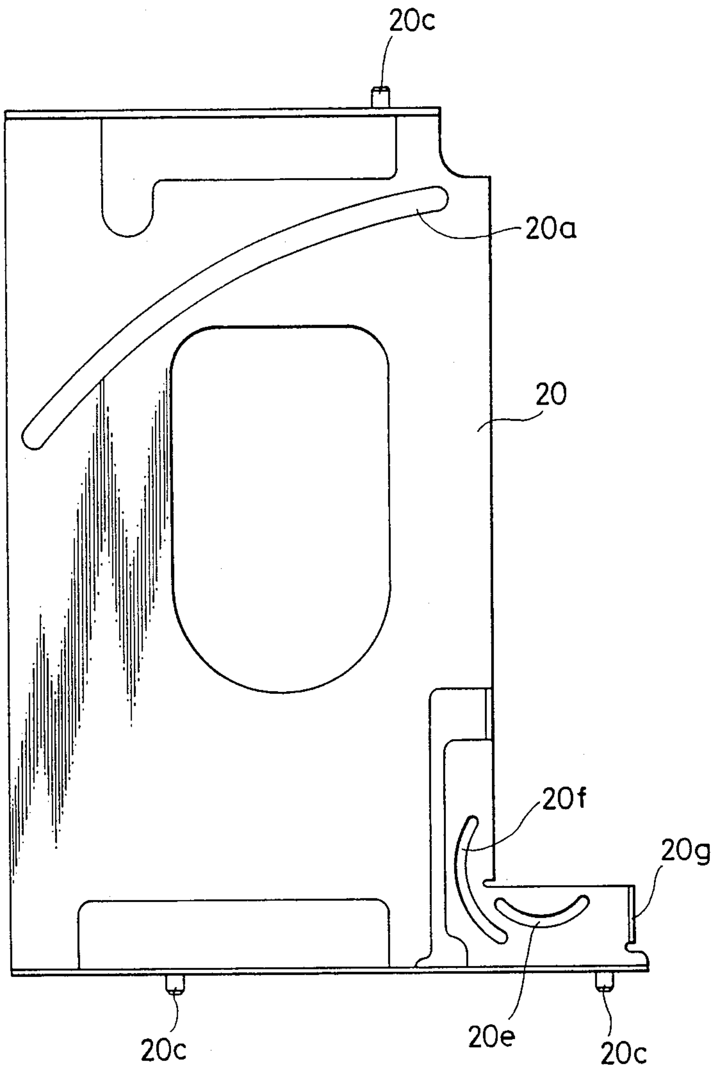

As shown in FIG. 12, the upper side of the movable chassis B 20 is provided with an arched guide projection 20a that is in face-to-face relationship with the arched guide face 19a and spaced therefrom by a distance far greater than the thickness of each of the trays 11 and 12 and which is capable of making sliding contact with the rotating end of each tray. The arched guide face 19a combines with the arched guide projection 20a to form a tray guide for guiding a single tray projecting form the magazine body 8.

Figure 6:
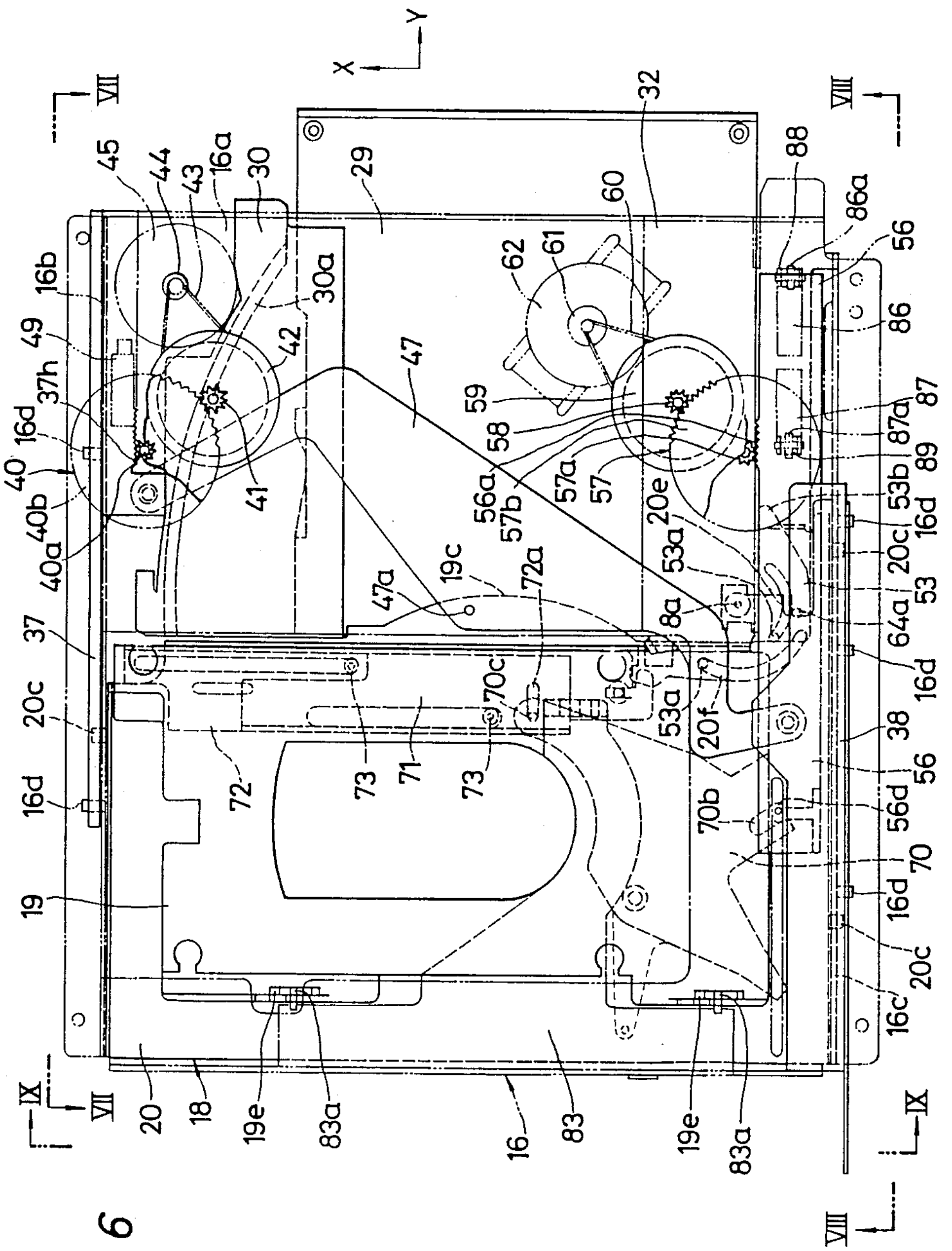
FIG. 6 is a plan view of the internal construction of the multidisk player.
Figure 9:
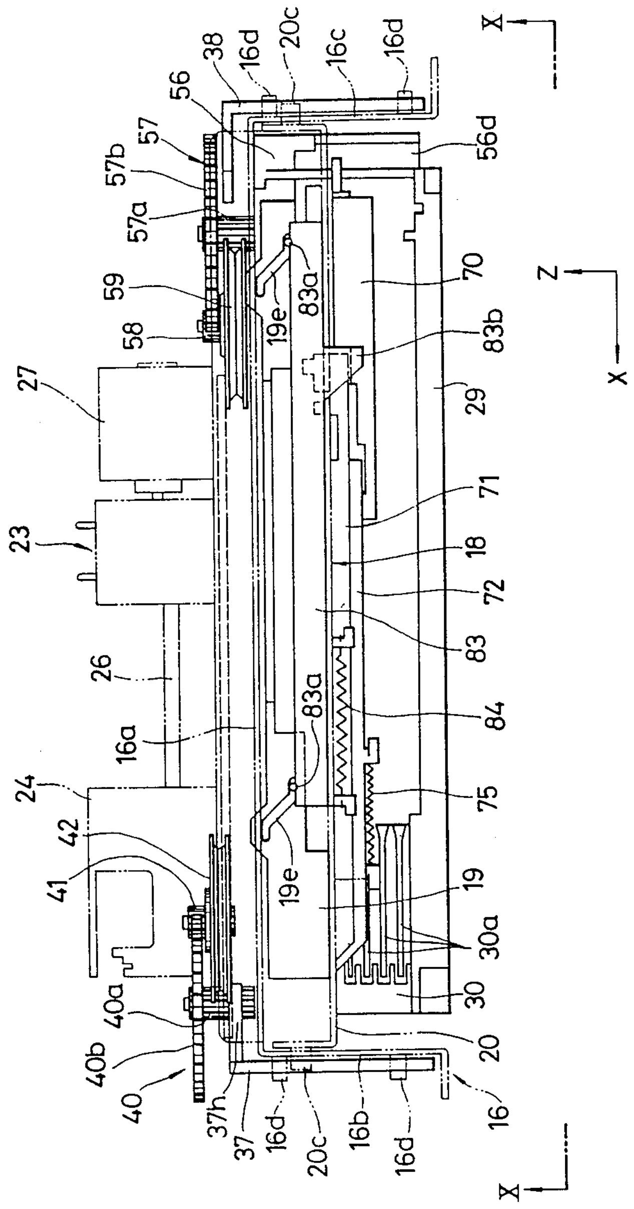
Figure 10:
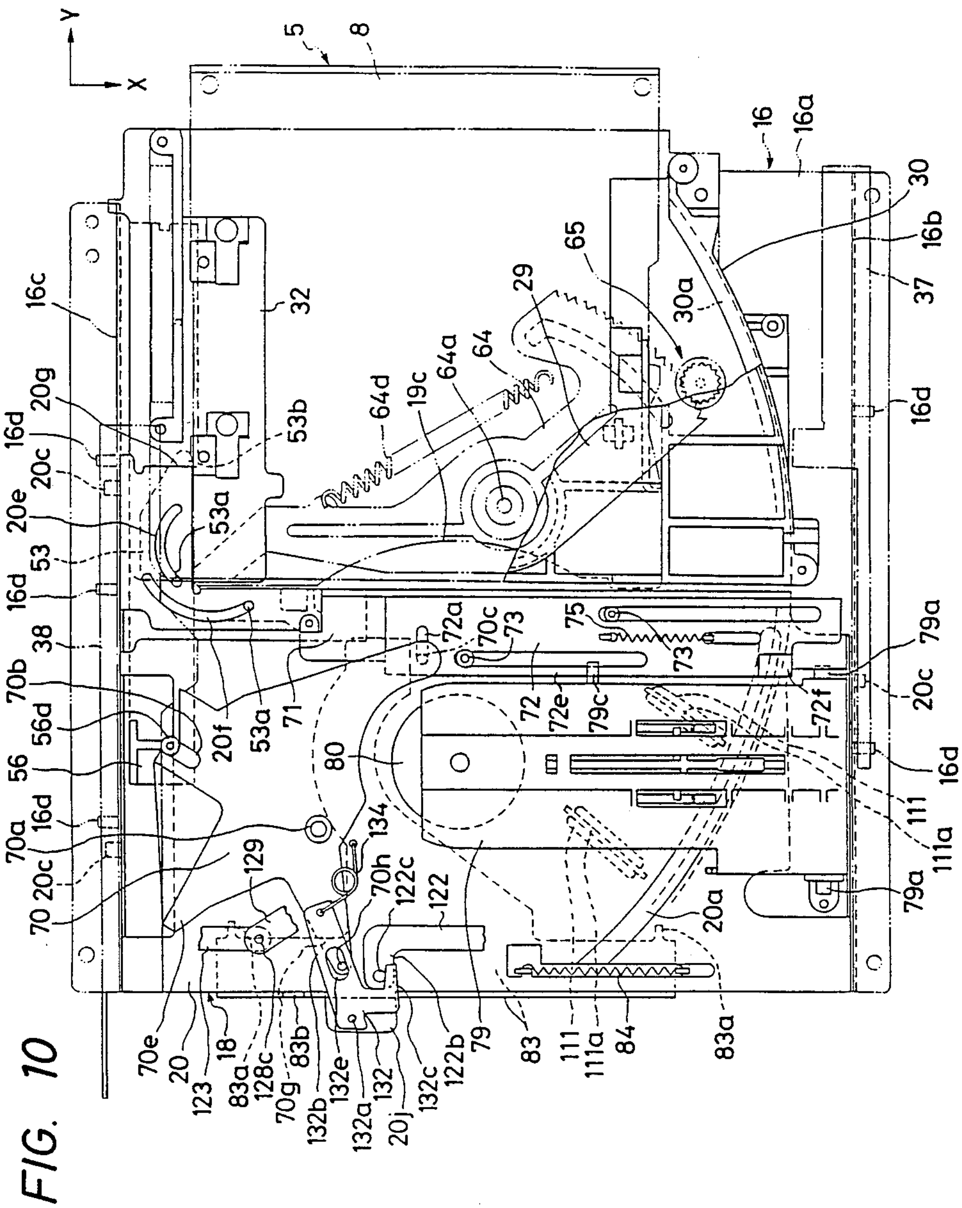
FIG. 10 is an arrow diagram taken on line X—X concerning FIG. 9.
Figure 13:
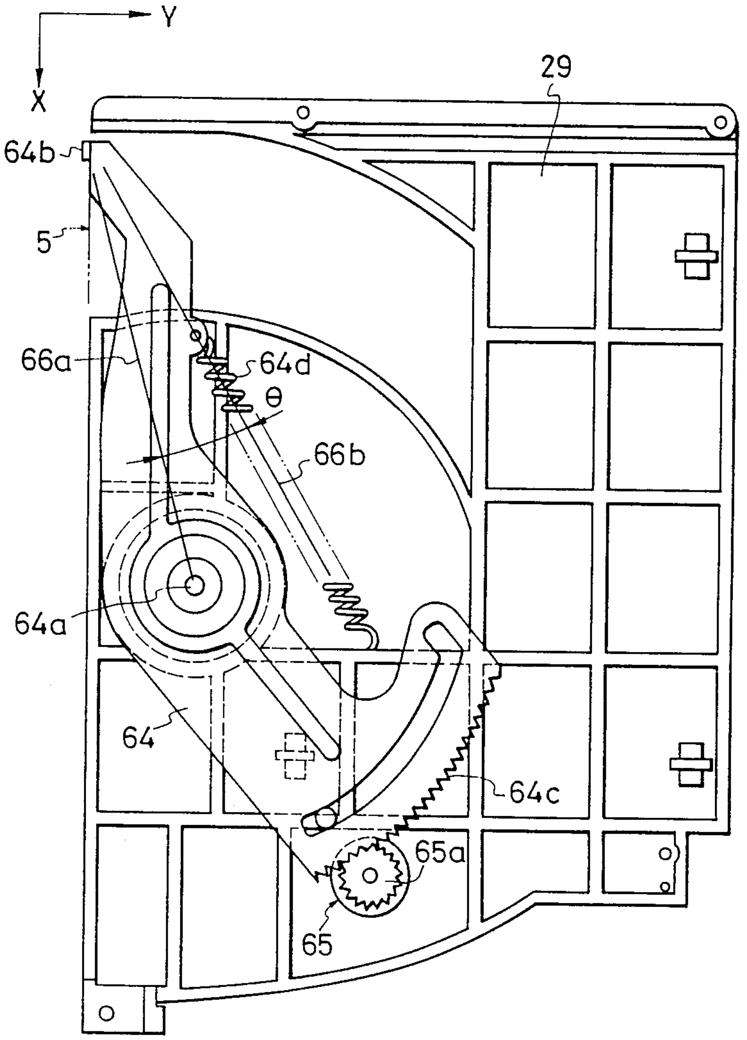

As shown in FIGS. 6, 9 and 10, a tabular guide/hold member 29 that makes sliding contact with the underside of the magazine 5 for guiding and holding the latter is disposed between the front ends of the erect portions 16b and 16c of the chassis 16. This guide/hold member 29 is secured to the planar portion 16a of the chassis 16 by, for example, a screw. Details of the guide/hold member 29 are shown in FIG. 13. A tray guide member 30 is provided on top of the left end of the guide/hold member 29. The tray guide member 30 is provided with a plurality of arched tray guide grooves 30a that are positioned between the tray guide (composed of the arched guide face 19a and the arched guide projection 20a) and the tray guide channel in the magazine body 8 and which are continuous from each of these members. The trays 11 and 12 projecting from the magazine body 8 slide along the tray guide grooves 30a as they are kept in engagement therewith and are thereafter guided into the already described tray guide on the moving member 18. The tray guide channel in the magazine body 8 is composed of 8c and openings partitions 8b (see FIG. 3) and is provided with a plurality of guide grooves (not shown) similar to the guide grooves 30a.

Figure 14:
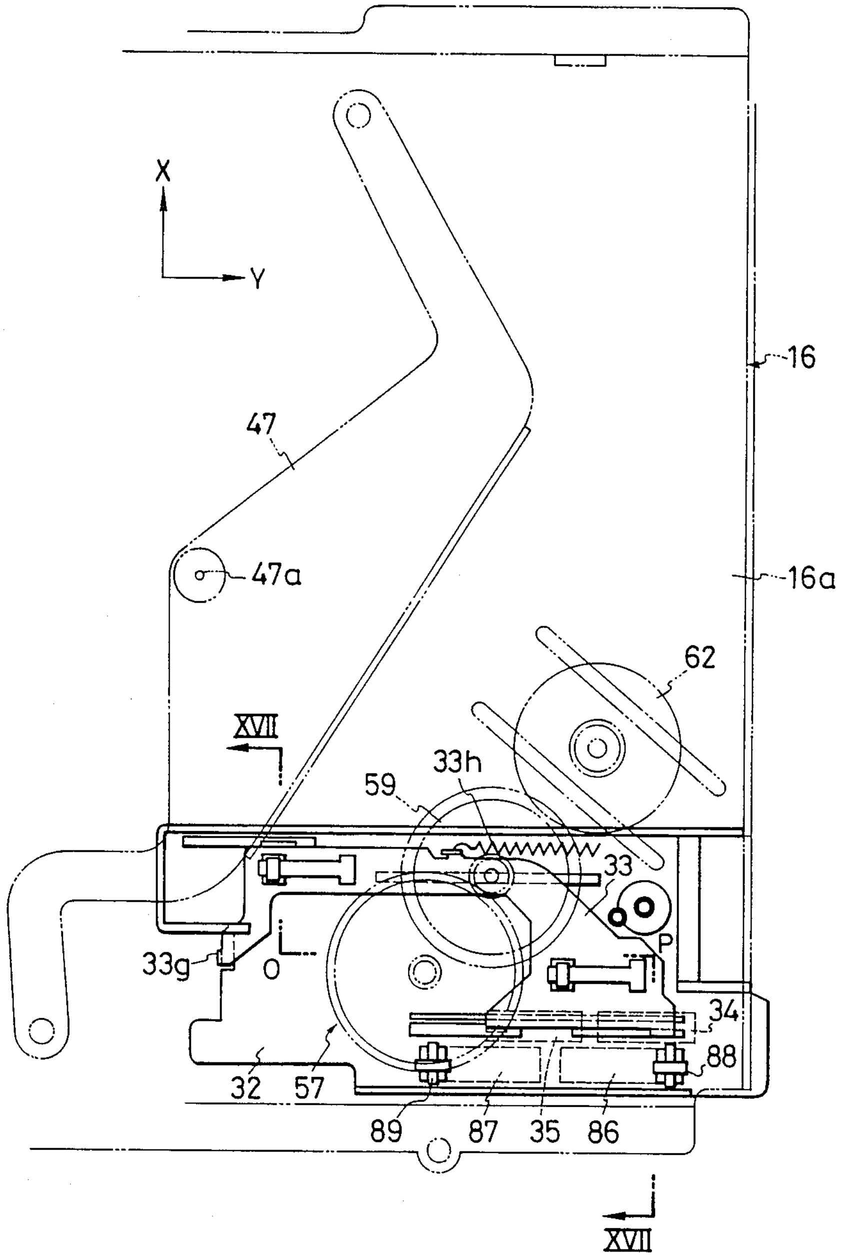
Figure 15A:
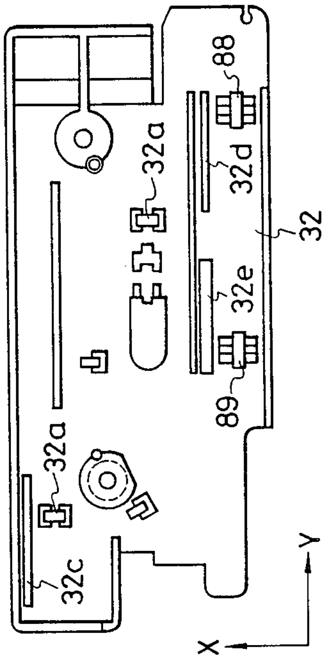
Figure 15B:
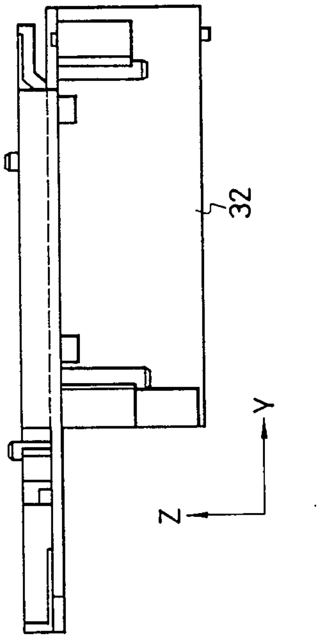
Figure 15C:
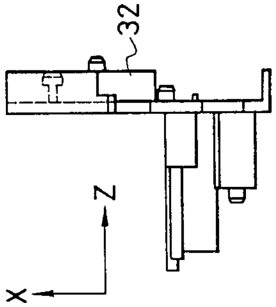
Figure 16A:
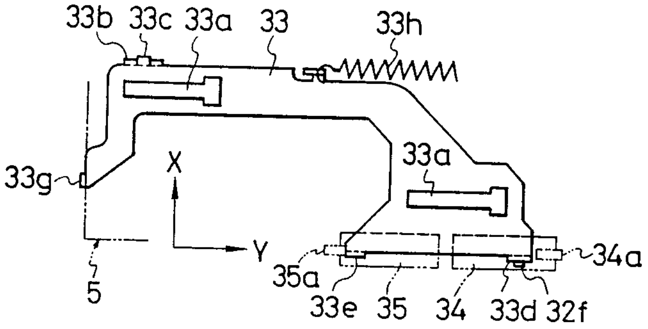
Figure 16B:
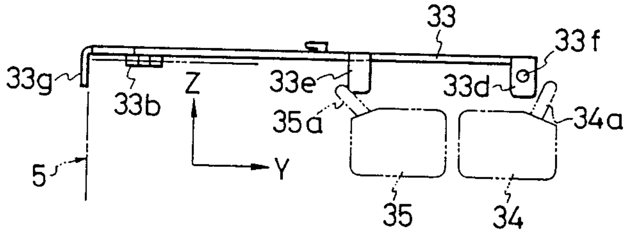
Figure 17:
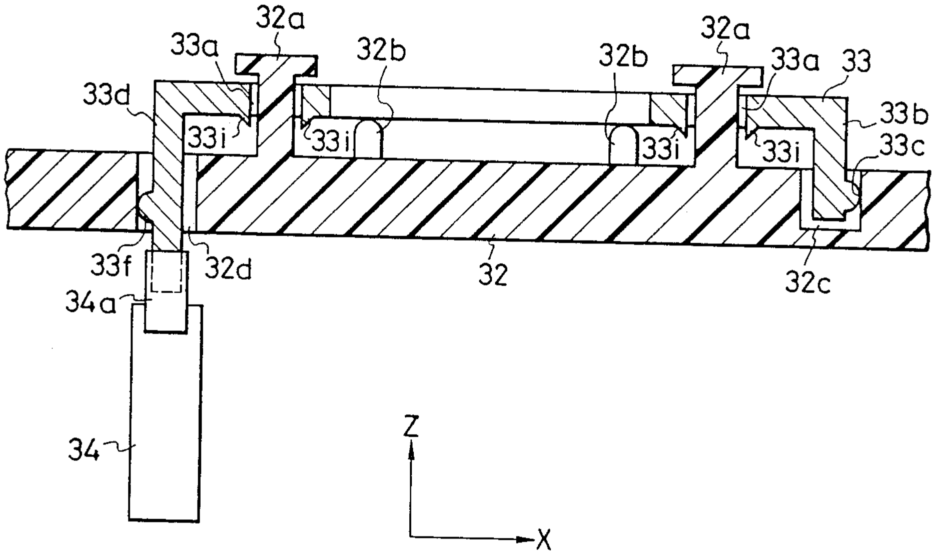

As shown in FIGS. 6, 10, and 14, a plastic support 32 is arranged close to the magazine-loading means, i.e., on the right-hand side thereof within the player housing 2 and fixed to the underside of the flat side 16*a* of the chassis 16 with screw bolts. FIGS. 15(*a*) through (*c*) show the support 32 in detail. As shown in FIG. 14, a steel moving lever 33 is movably attached to the surface of the support 32 along the magazine-loading direction, i.e., in the longitudinal direction (in the directions of the arrow Y and opposite thereto). FIGS. 16(*a*), (*b*) show the moving lever 33 in detail. As shown in FIGS. 15(*a*) through (*c*), 16(*a*), (*b*), the moving lever 33 is attached in such a manner that a pair of linear slits 33*a* extended and formed in the longitudinal direction of the moving lever 33 slidably mate with T-shaped projections 32*a* of the support 32. As shown in FIG. 17, bosses 32*b* for smoothly abutting against the underside of the moving lever 33 and supporting the moving lever 33 are provided on the surface of the support 32.

An overhang 33*b* extended downward is formed at the left rear end of the moving lever 33 and slidably mates with a linear groove 32*c* extended in the longitudinal direction and formed in the left end surface of the support 32. In this case, a boss 33*c* is formed on the left side of the overhang 33*b* and smoothly abuts against the left wall of the linear groove 32*c*. Moreover, two overhangs 33*d*, 33*e* extended downward and also set apart from each other in the longitudinal direction (in the directions of the arrow Y and opposite thereto) are formed at the right front end of the moving lever 33. The overhangs 33*d*, 33*e* slidably mate with two linear openings 32*d*, 32*e* extended and fromed in the longitudinal direction at the right front end of the support 32. A boss 33*f* is formed on the right side of the overhang 33*d* and smoothly abuts against the right wall of the linear opening 32*d*.

As shown in FIGS. 16(*a*) and 16(*b*), an overhang 33*g* protruding downward is provided at the rear end of the moving lever 33 and the rear end of the magazine 5 is allowed to mate therewith. In other words, the moving lever 33 is caused to move rearward by the mating of the rear end of the magazine 5 with the overhang 33*g*. Moreover, a coil spring 33*h* for energizing the moving lever 33 forward (in the direction of the arrow Y) is coupled to the moving lever 33.

As shown in FIGS. 14, 16(*a*), (*b*), a pair of detecting switches 34, 35 are arranged beneath the moving lever 33, so that the overhangs 33*d*, 33*e* of the moving lever operate actuator elements 34*a*, 35*a* by mating with them.

The moving lever 33 and the detecting switches 34, 35 constitute the loaded magazine-detecting means for detecting the loading of the magazine 5 in the magazine loading means in the player housing 2.

As shown in FIG. 17, although burrs 33*i* produced when the linear slits 33*a* are made by punching are left on the edges of the pair of the linear slits 33*a* formed on the moving lever 33, the support 32 is prevented from touching the burrs 33*i* by attaching the moving lever 33 to the support 32 in the aforementioned manner.

A description will subsequently be given of a moving means for moving the moving member 18 consisting of moving the chassis A19, B20 vertically (in the directions of the arrow Z and opposite thereto).

Figure 7:
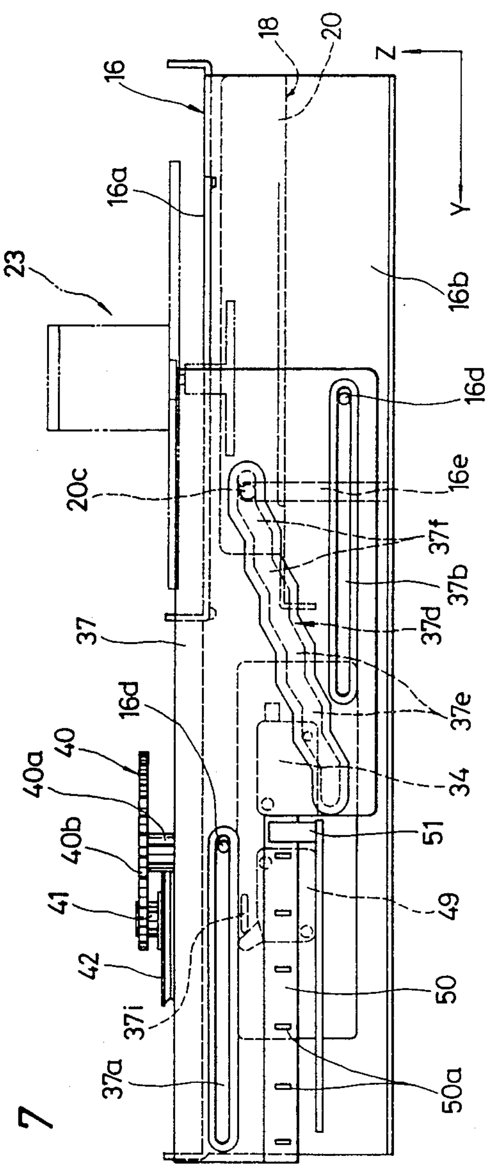
FIGS. 7 through 9 are arrow diagrams taken on line VII—VII concerning FIG. 6.
Figure 8:
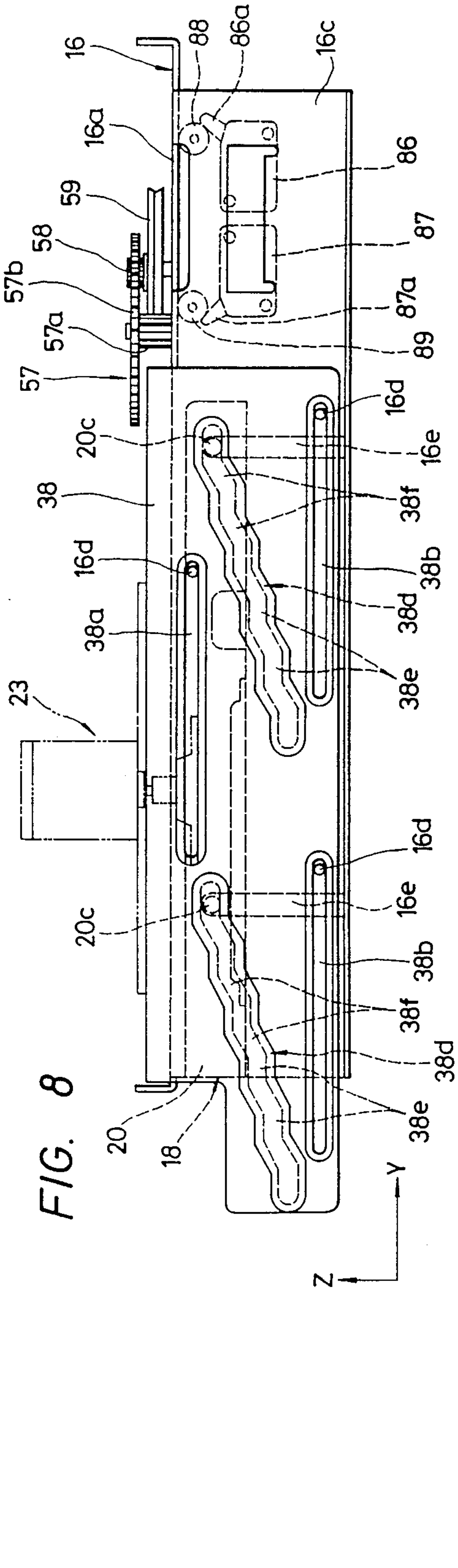

As shown in FIGS. 6 through 10, a pair of longitudinally movable plates 37, 38 longitudinally extending as moving members are provided on the outer faces of the left and right elevational sides 16*b*, 16*c* of the chassis 16. As shown in FIGS. 7, 8, guide grooves 37*a*, 37*b* and 38*a*, 38*b* extending in the longitudinal direction of the moving plates 37, 38 are formed therein, respectively. Each of the moving plates 37, 38 is attached to the chassis 16 as a support when the guide groove externally movably mates with the pin 16*d* projected from the outer face of each of the elevational sides 16*b*, 16i c. That is, the moving plates 37, 38 are allowed to reciprocate in the longitudinal direction.

For the purpose of the following discussion, let the moving member 18 composed of the movable chassis A 19 and the movable chassis B 20 be referred to as the first moving member, and let the combination of the moving plates 37 and 38 be called the second moving member. As is clear from FIGS. 7 and 8, the guide grooves 37*b* and 38*b* are formed in the moving plates 37 and 38, respectively, at positions closer to one side with respect to the direction in which these plates are moved (i.e., the lower side in the embodiment shown), but the other set of guide grooves 37*a* and 38*a* are positioned farther away from the lower side of either plate.

The movable chassis B 20 which is one of the two components of the first moving member 18 is provided with three projecting pins 20*c*, one being on the left side and two on the right side. As is clear from FIGS. 7 and 8, one pin 20*c* is movably fitted through a guide groove 16*e* formed in the vertical direction in the left-hand erect portion 16*b* of the supporting chassis 16, while the other two pins 20*c* are movably fitted through guide grooves 16*e* formed in the vertical direction in the right-hand erect portion 16*c* of the chassis 16. By this arrangement, the movable chassis B 20 is guided in the vertical direction.

For the purpose of the following description, let the guide grooves 16*e* formed in the chassis 16 be referred to as the first group of guide grooves, and let the guide grooves 37*b* and 38*b* formed in the moving plates 37 and 38 (i.e., forming the second moving member) be called the second group of guide grooves.

The pins 20*c* studded on both the right and left sides of the movable chassis B 20 project to the outside of the chassis 16 through the guide grooves 16*e* formed in that chassis, and cam grooves 37*d* and 38*d* formed in the inside surfaces of the moving plates 37 and 38 (i.e., forming the second moving member) are in movable engagement with these pins 20*c*. The overall shape of the cam groove 37*d* formed in the moving plate 37 is such that it is inclined both in the forward direction (as indicated by the arrow Y) and in the downward direction (opposite to the direction indicated by the arrow Z). On the other hand, the overall shape of the cam groove 38*d* formed in the moving plate 38 is such that it is inclined both in the forward direction and in the upward direction. In other words, the cam grooves 37*d* and 38*d* are formed such that when the moving plates 37 and 38 (i.e., forming the second moving member) make relative movements, the first moving member 18 (composed of the movable chassis A 19 and the movable chassis B 20) will move in the vertical direction.

The cam groove 37*d* (or 38*d*) is formed between the guide groove 37*b* (or 38*b*), which is formed on one side (i.e., lower side) with respect to the direction in which the moving plate 37 (or 38) moves, and the other side (i.e., upper side) of said moving plate. The cam groove 37*d* (or 38*d*) is composed of 6 linear portions 37*e* (or 38*e*) extending in the direction in which the moving plate 37 (or 38) moves (i.e., in forward and backward directions) and 5 bridge portions 37*f* (or 38*f*) that connect these linear portions and are inclined with respect thereto; because of this arrangement, the cam groove 37*d* (or 38*d*) has an overall configuration resembling a staircase. As shown in FIGS. 7 and 8, one end of the cam groove 37*d* (or 38*d*) is in alignment with one end of the guide groove (second guide groove) 16*e* formed in the chassis 16.

As will be apparent from the foregoing description, the moving member 18 (or the movable chassis B 20 which is one component of said member) is supported at three points with respect to the supporting chassis 16 by means of the pin 20*c* and the moving plates 37 and 38. As is clear from FIG. 10, one of these support points (i.e., the position of pin 20*c*) is disposed in the vicinity of the junction between the tray guide groove 30*a* in the tray guide member 30 and the tray guide on the moving member 18 (as composed of the arched guide face 19*a* on the movable chassis A 19 and the arched guide projection 20*a* on the movable chassis B 20).

The advantage of disposing one of the three support points for the moving member 18 at the position described above is that the position of the tray guide on the moving member 18 can be determined with high precision with respect to the tray guide groove 30*a*, thereby ensuring smooth and precise transport of disks.

As shown in FIGS. 6 and 9, the left-hand moving plate 37 is provided at the right front end with a rack 37*h* that extends in the direction in which said moving plate extends. This rack 37*h* meshes with the small gear wheel 40*a* on a double gear 40 that is provided on the planar portion 16*a* of the chassis 16. The large gear wheel 40*b* on the double gear 40 is coupled to the output shaft of a motor 45 by means of a gear wheel 41, a pulley 42 that is integral with said gear wheel 41, a belt 43 and a small pulley 44. Between the left-hand moving plate 37 and the right-hand moving plate 38 is provided a pivoting lever 47 that is mounted generally in the center of the planar portion 16*a* of the chassis 16 such that it is pivotable about a support shaft 47*a* extending in the vertical direction (both in the direction indicated by the arrow Z and in the opposite direction). The opposite ends of the lever 47 are brought into engagement with right and left movable plates 37, 38.

The double gear 40 as combined with the gear wheel 41, the pulley 42, the belt 43, the small pulley 44, the motor 45, the pivoting lever 47 and associated minor peripheral members make up a means for imparting a driving force to the moving plates 37 and 38 forming the second moving member. This driving force imparting means as combined with the moving plates 37 and 38 forming the second moving member make up a means for causing the moving member 18 composed of the movable chassis A 19 and the movable chassis B 20 to move in the vertical direction (both in the direction indicated by the arrow Z and in the opposite direction).

As shown in FIG. 7, a sensor switch 49 is provided on the inner surface of the left-hand erect portion 16*b* of the chassis 16. This sensor switch 49 checks to see if the moving plate 37 as one component of the second moving member which is reciprocating in forward and backward directions is at its most retracted limit position (the position for the limit of the forward movement); the switch is actuated when its actuator comes into engagement with a projection 37*i* studded on the left-hand surface of the moving plate 37. The right-hand surface at the front end of the moving plate 37 is provided with an address plate 50 having six slits 50*a* aligned in the direction in which said moving plate 37 moves. At the rear of the sensor switch 49 is provided a photosensor 51 for detecting each of the slits 50*a* in the address plate 50. For the purpose of the following description, let the sensor switch 49 be referred to as the first sensor, and the photosensor 51 as the second sensor. A series of slit detection signals from the second sensor are fed to a counter (not shown) where they are counted. A unit (not shown) for performing automatic control of the multi-disk player is contained at a predetermined location in the housing 2 and this control unit uses the output from the counter in order to determine the position where the moving plate 37 has stopped.

The first sensor (sensor switch) 49 as combined with the address plate 50, the second sensor (photosensor) 51, the counter and the control unit make up a positioning mechanism by which the moving plate 37 is moved to a desired address position and has its location determined at that position. If a command for moving is supplied while the second sensor (photosensor) 51 is issuing slit detection signals, the positioning mechanism causes the moving plate 37 to move by a distance proportional to the difference between the present address and the desired address. If a command for moving is supplied when the photosensor 51 is issuing no slit detection signal, the positioning mechanism will cause the moving plate 37 to move to the position of the desired address after the plate has been moved (in the backward direction) to a position where a detection signal can be obtained from the first sensor (sensor switch) 49.

Figure 18:
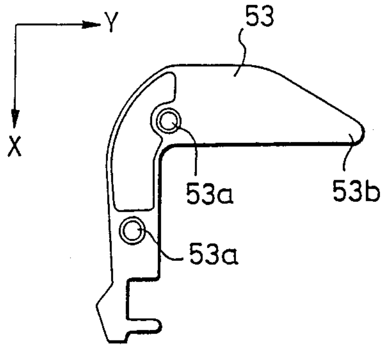

As shown in FIGS. 6 and 10, the movable chassis B 20 which is one component of the moving member 18 is provided at the upper right-hand front end with a tray projecting member 53 that engages with each one of the trays 11 and 12 within the magazine 5 so as to cause the individual trays to .be projected to the outside of the magazine body 8. Details of the tray projecting member 53 are shown in FIG. 18. As one can see from FIG. 18, the tray projecting member 53 has a generally L-shaped overall view and is guided by means of a pair of pins 53*a* that are studded on the tray projecting member and which make movable engagement with two arched guide grooves 20*e* and 20*f* (see, for example, FIG. 12) having different radii that are formed in the movable chassis B 20. The pins 53*a* are slightly long with respect to the guide grooves 20*e* and 20*f* so that the tray projecting member 53 has a small clearance in the direction in which the trays are stacked. Stated more specifically, the tray projecting member 53 rotates about the center of curvature of each of the arched guide grooves 20*e* and 20*f* so that the rotating end 53*b* of the member 53 will push the trays 11 and 12 to project from the magazine body 8. In this connection, it should be mentioned that as is clear from FIGS. 2(*b*) and 6, the imaginary axis of rotation of the tray projecting member 53 (i.e., the center of curvature of the guide groove 20*e* or 20*f*) coincides with the axis 8*a* around which each of the trays 11 and 12 will rotate. The tray 11 (or 12) is caused to project to the outside of the magazine body 8 as a result a portion 11*m* (or 12*m*) close to the axis of rotation 8*a* (see FIGS. 2(*b*), 4(*a*), 5(*a*)) being pushed by the tray projecting member 53.

The tray projecting member 53 is made of a comparatively soft resin and its rotating end 53*b* is made flexible in the vertical direction, or in the direction in which the trays 11 and 12 are stacked. In addition, as mentioned in the previous paragraph, the tray projecting member 53 is provided with a small clearance in the vertical direction. Because of its flexibility, if part of the rotating end 53*b* is inserted into the tray guide channel (described hereinbefore) in the magazine body 8, it will move along this tray guide channel. In its inoperative mode, the rotating end 53*b* of the tray projecting member 53 engages with a Y-shaped groove 20*g* in he movable chassis B 20 (FIG. 10) and makes a limited movement in the upward direction (as indicated by the arrow Z).

The tray projecting member 53 is provided on the movable chassis B 20 which is one component of the moving member 18. Therefore, the moving member moving means (composed of the moving plates 37 and 38, etc.) as combined with the positioning mechanism including the address plate 50 make up a tray projecting member moving means that will cause both the tray projecting member 53 and the moving member 18 to move to the position where the tray projecting member 53 engages with the tray (11 or 12) carrying the disk 10 to be played.

The trays 11 and 12 are caused to project from the magazine body 8 by rotating and driving the tray projecting member 53, and the means driving the tray projecting member is described hereinafter.

Figure 19A:
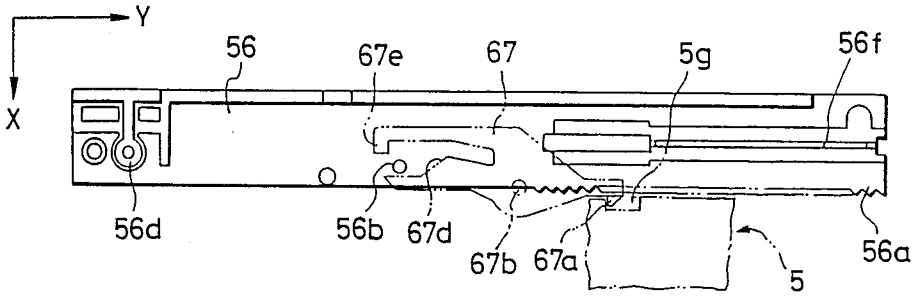
Figure 19B:
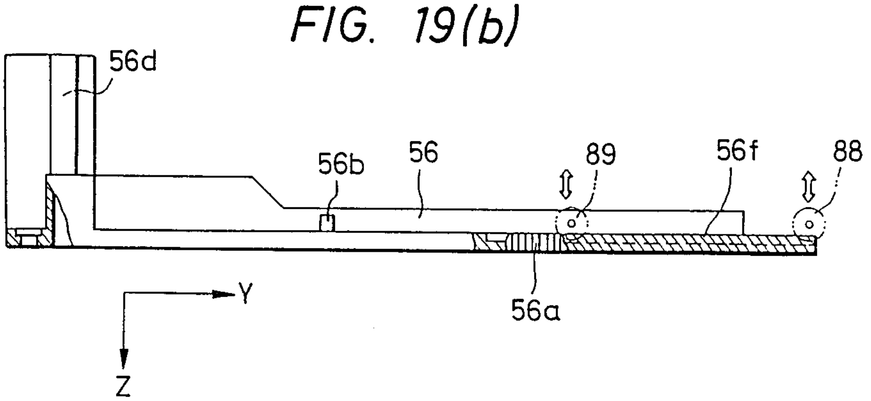

As shown in FIGS. 6, 9 and 10, a moving body 56 that extends in forward and backward directions is arranged on the right-hand side of the chassis 16 and mounted thereon in such a manner that it is freely movable in the direction in which it extends. Details of the moving body 56 are shown in FIGS. 19(*a*) and 19(*b*). The moving body 56 is provided at the left-hand front end with a rack 56*a* that extends in the direction in which said moving body 56 extends. This rack 56*a* meshes with the small gear wheel 57*a* on a double gear 57 that is provided on the planar portion 16*a* of the chassis 16. The large gear wheel 57*b* on the double gear 57 is coupled with an output shaft of a motor 62, which is a torque generating means, through a gear wheel 58, a pulley 59 that is integral with said gear wheel 58, a belt 60, and a small pulley 61. The combination of the double gears 57, gear 58, pulley 59, belt 60, small pulley 61, motor 62 and associated minor peripheral members make up a means for imparting a driving force to the moving body 56.

As shown in FIGS. 10, 13, an oscillating lever 64 for ejecting the magazine 5 loaded on the magazine-loading means outwardly therefrom is extended in a transverse direction, arranged close to the deepest portion of the magazine-loading means in the player housing 2 and furthermore attached to roughly the center of the underside of the guide-holding member 29 through a pin 64*a*. In this case, the pin 64*a* is extended vertically (in the directions of the arrow Z and opposite thereto). As is clear from FIG. 13, an overhang 64*b* extending upward is projected from the right end of the oscillating lever 64, which abuts against the rear end of the magazine 5 in the overhang portion. Moreover, a gear 64*c* with the pin 64*a* as its curvature radius is formed at the left end of the oscillating lever 64 and a control gear 65*a* attached to a dumper 65 engages with the gear 64*c*. The dumper 65 provides control force with the viscosity resistance of a viscous agent such as grease held inside the dumper 65. The oscillating lever 64 is supplied by the coil spring 64*d* with the force for ejecting the magazine.

The oscillating lever 64, the dumper 65 and the coil spring 64*d* constitute the ejection means for ejecting the magazine 5 from the magazine-loading means within the player housing 2. As is obvious from FIG. 13, given that an angle formed between a straight line 66*a* connecting the center (pin 64*a*) of oscillation of the oscillating lever 64 and the point (overhang 64*b*) where the oscillating lever mates with the magazine 5, and a straight line 66*b* passing through the center of a coil spring 64*d* is $\theta$, the coil spring 64*d* is always positioned so as to make that angle $\theta$ acute, irrespective of the angle of oscillation of the oscillating lever 64. Consequently, the force for ejecting the magazine provided by the coil spring 64*d* for the oscillating lever 64 is always kept constant, irrespective of the oscillating angle of the oscillating lever 64.

As shown in FIG. 19(*a*), a lock member 67 for locking the magazine to the player housing 2 in the position of installation by the mating of one revolving end 67*a* thereof with the mating recess 5*g* (see FIGS. 2(*b*), (*c*)) of the magazine 5 is provided rotatably around a pin 67*b* close to the moving body 56. The position of the lock member 67 shown in FIG. 19(*a*), i.e., the position where the lock member locks the magazine is called a first position, whereas the position where the one revolving end 67*a* is isolated from the mating recess 5*g* of the magazine after it has revolved counterclockwise of FIG. 19(*a*) by a fixed angle, i.e., the position where the locked state is released, is called a second position. The lock member 67 is so energized by a spring member (not shown) as to make the revolving one end 67*a* fit into the mating recess 5*g* of the magazine 5. As shown in FIG. 19(*b*), a pin 56*b* is projected from a fixed position on the surface of the moving body 56 and a tapered means 67*d* formed at the other revolving end of the lock member 67 is allowed to mate with the pin. In other words, the above locked state of the magazine 5 because of the lock mechanism consisting of the lock member 67 and the spring member (not shown) is released as the moving body 56 moves forward. A bend 67*e* extending roughly to the left is formed at the other revolving end of the lock member 67 and, when the lock member is located close to the second position, the bend 67*e* mates with the pin 56*b* of the moving body 56, whereby the backward movement of the moving body is regulated.

Figure 20:
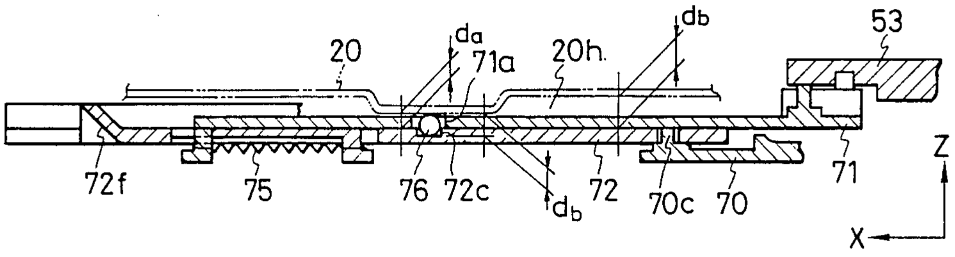
Figure 21:
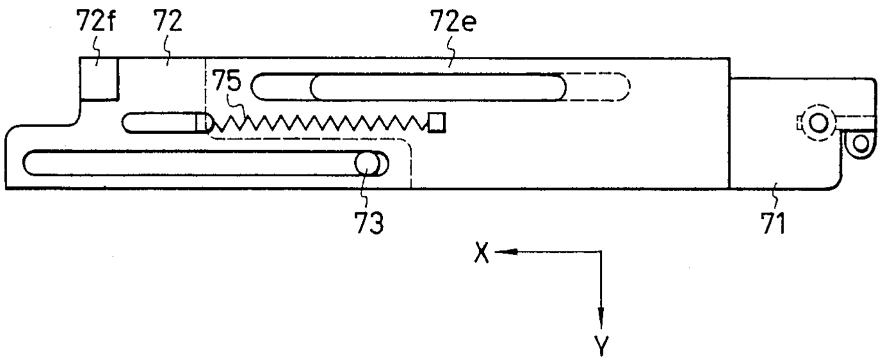
Figure 22A:
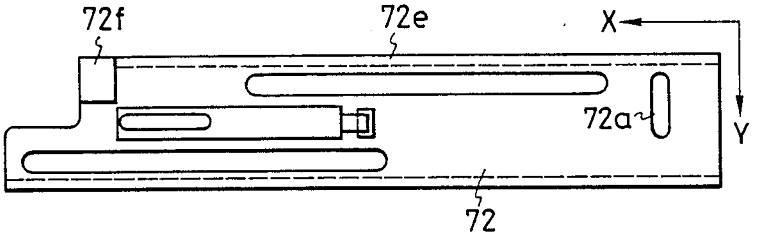
Figure 22B:
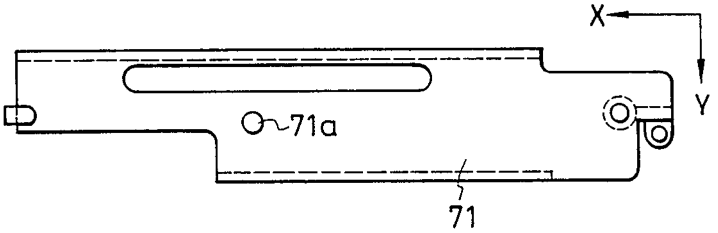

As shown in FIGS. 6, 9 and 10, the underside of the moving member 18 (or the movable chassis B 20 which is one component of said member 18) that moves in the vertical direction (both in the direction indicated by the arrow Z and in the opposite direction) is provided with an intermediate lever 70 that is pivotally mounted on a pin 70*a*. One pivoting end of the intermediate lever 70 is provided with a U-shaped notch 70*b* that is capable of smooth engagement with a cylindrical engaging portion 56*d* formed to extend in the vertical direction through the rear end of the moving member 56. As is also shown in FIGS. 20 and 21, the movable chassis B 20 is provided at its lower front end with a first lever member 71 and a second lever member 72 each extending in rightward and leftward directions. These levers 71 and 72 are mounted on the movable chassis B 20 by means of a plurality of pins 73 such that the levers 71 and 72 will be capable of reciprocating in the directions in which they extend. Details of the second and first levers 72 and 71 are shown in FIGS. 22(*a*) and 22(*b*), respectively. As shown, for example in FIG. 10, a pin 70*c* is studded on the other pivoting end of the intermediate lever 70 and this pin is slidably fitted in a slot 72*a* formed at the right-hand end of the second lever member 72 to extend in forward and backward directions. Stated more specifically, if the moving body 56 reciprocates in forward and backward directions (in the direction indicated by the arrow Y and in the opposite direction), the intermediate lever 70 will rotate around the pin 70*a*, whereby the second lever member 72 is caused to reciprocate in leftward and rightward directions (in the direction indicator by the arrow X and in the opposite direction). The above-described moving body 56 as combined with the means (including the motor 62) for imparting a drive force to the moving body 56, the intermediate lever 70 and associated minor peripheral members make up a mechanism for driving the second lever member 72. It is to be mentioned that the first lever member 71 engages with the tray projecting member 53 at its right-hand end and is capable of rotating the lever member as a result of movement in the advancing direction (or movement to the right). The second lever member 72 serves to move the support (to be described hereinafter) which is one component of the clamping mechanism to be also described hereinafter.

As shown in FIGS. 10, 20 and 21, the first lever member 71 is connected to one end of a coil spring 75 that will urge the lever member 71 in the direction of its advancement or in the rightward direction (opposite to the direction indicated by the arrow X). The coil spring 75 is incorporated in such a manner that it connects the first and second levers 71 and 72, with the other end of the spring 75 being connected to the second lever member 72.

As shown in FIG. 20, the underside of the movable chassis B 20 is provided with a first recess 20*h* extending in leftward and rightward directions (both in the direction indicated by the arrow X and in the opposite direction), and the upper surface of the second lever member 72 is provided with a second recess 72*c* that is capable of maintaining a face-to-face relationship with the first recess 20*h* of the movable chassis B 20. The first lever member 71 which is so positioned as to be sandwiched between the movable chassis B 20 and the second lever member 72 is provided with an opening 71*a* that is capable of maintaining a face-to-face relationship with these first and second recesses 20*h* and 72*c*. The opening 71*a* contains a movable slider ball 76 that is capable of engaging with the first recess 20*h* and the second recess 72*c*. The dimension indicated by da in FIG. 20, or the distance between the opposing faces of the movable chassis B 20 and the second lever member 72 within the limits of their relative movement, is smaller than the outside dimension of the movable slider ball 76. The dimension indicated by db in FIG. 20, or the distance by which any one of the opposing surfaces of the movable chassis B 20 and the second lever member 72 is spaced from the bottom surface of either one of the first recess 20*h* and the second recess 72*c* which is in a face-to-face relationship with any one of said opposing surfaces, is slightly larger than the outside dimension of the movable slider ball 76.

The first and second recesses, 20*h* and 72*c*, as combined with the opening 71*a*, the movable slider 76 and associated minor members make up a lock/unlock means that locks the first and second lever members 71 and 72 and which, when the locked lever members advance in the rightward direction (opposite the direction indicated by the arrow X) until the first lever member 71 has reached an area in the vicinity of its most advanced position (i.e., the position where the tray projecting member 53 rotated by the first lever member has caused the trays 11 and 12 to project fully from the magazine body 8), unlocks the lever members 71 and 72. After being unlocked from the second lever member 72, the first lever member 71 will make a slight movement toward its most advanced position by means of the urging force exerted by the aforementioned coil spring 75. In addition, while the first lever member 71 is making this slight movement, the arched portions 11*n* and 12*n* of the trays 11 and 12 (see FIGS. 4(*a*) and 5(*a*)) contact an arched contact portion 19*c* formed on the movable chassis A 19 (see FIGS. 6 and 10), whereby the disk 10 carried on each of these trays is positioned concentrically with, or right under, the disk-carrying surface 23*a* (see FIG. 11(*b*)) of the turntable 23.

The lock/unlock means (composed of the movable slider 76 and associated members) as combined with the first and second lever members 71 and 72, the coil spring 75 as the urging means, and the second lever member 72 driving mechanism including the moving body 56 and the motor 62 (as already described) make up a tray projecting member drive means that rotates and drives the tray projecting member 53 (FIG. 18) so as to cause the trays 11 and 12 to project from the magazine body 8.

The tray projecting member drive means as combined with the chassis 16 (i.e., supporting member), the moving member 18 (i.e., the first moving member composed of the movable chassis A 19 and the movable chassis B 20), the tray projecting member 53 and the tray projecting member moving means composed of the moving plates 37, 38, etc. make up a tray projecting means that causes the tray 11 or 12 carrying the desired disk 10 to project from the magazine body 8.

As shown in FIG. 10, the lower left-hand side of the moving member 18 (or the movable chassis B 20 which is one component of said member) is provided with a support 79 that extends in both leftward and rightward directions (the direction indicated by the arrow X and the opposite direction) and which is mounted on the movable chassis B 20 such that it is capable of swinging about a pin 79*a* provided at its left end. Since the pin 79*a* extends in forward and backward directions (both in the direction indicated by the arrow Y and in the opposite direction), the support 79 will swing in a plane perpendicular to the disk-carrying surface 23*a* of the turntable 23 (see FIG. 11(*b*)). The free end of the support 79 is rotatably provided with a disk-shaped depressing member 80 that makes contact with the side of the disk 10 which is opposite the side facing the turntable 23 so as to clamp the disk in cooperation with the turntable 23. As will be described later, a coil spring is installed so that the support 79 is energized thereby in such a direction as to be biased towards the disk-holding face of the turntable 23.

The above-described support 79, depression member 80 and associated members make up a clamp mechanism for clamping the disk.

As shown in FIG. 10, a forwardly extending pin 79*c* is studded on the free end of the support 79 and this pin engages with a planar guide portion 72*e* at the upper rear edge of the second lever member 72. A tapered portion 72*f* that is capable of engaging with the pin 79*c* on the support 79 is formed at a position that is on an extension of the planar guide portion 72*e* and which is at the left end of the second lever member 72. As is evident from FIG. 20, the tapered portion 72*f* is inclined both in the left direction (indicated by the arrow X) and in the upward direction (indicated by the arrow Z). Because of this arrangement, as the second lever member 72 advances in the rightward direction (indicated by the arrow X), the pin 79*c* on the support 79 slides on the planar guide portion 72*e* and, at the same time, the depressing member 80 is held in its unclamped position while the pin 79*c* is depressed along the tapered portion 72*f* so as to cause the depressing member 80 to move to the clamped position.

The shapes of the turntable 23 and the press member 80 will subsequently be described.

Figure 23:
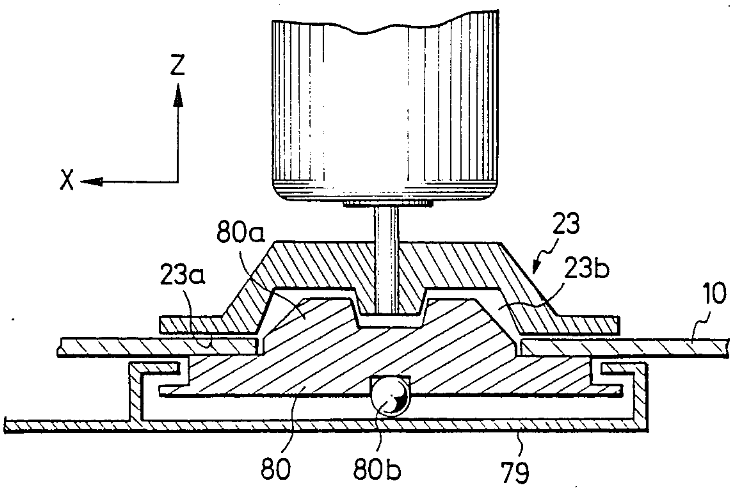

As shown in FIG. 23, a projection 80*a* is formed in the center of rotation of the discoidal press member 80, the projection 80*a* being fitted into the center hole of the disk 10. On the other hand, a recess 23*b* for receiving the projection 80*a* is provided in the turntable 23. The above-described press member 80 is rotatably supported by the support 79 through a spherical ball bearing 80*b*, the support 79 itself being movable relative to the turntable 23. The clamp mechanism, the second lever member 72 and the driving mechanism for driving the second lever member constitute a disk shift means for shifting the disk 10 loaded on the tray 11 or 12 ejected by the tray ejection means out of the magazine body 8 in the direction perpendicular to the disk-holding face 3*a* (see FIG. 11(*b*)) of the turntable 23, i.e., upward (in the direction of the arrow Z) in this case. The disk shift means and the tray-ejecting means constitute the disk-unloading/conveying mechanism for successively selecting any one of the disks 10 in the magazine and conveying the disk onto the disk-holding face 23*a* of the turntable 23. The second lever member 72 and the above driving mechanism for driving the second lever member are simultaneously used as the tray-ejecting means and the disk shift means, respectively.

As shown in FIGS. 6, 9 and 10, a tabular disk holding member 83 is disposed such that it is sandwiched between the movable chassis A 19 and the movable chassis B 20 which are the two components of the moving member 18. This holding member 83 is mounted on the movable chassis A 19 by means of a plurality of pins 83*a* that are in movable engagement with a cam groove 19*e* formed in that movable chassis A. As is also shown in FIG. 11(*b*), the cam groove 19*e* is typically formed such that it is inclined both in the leftward direction (indicated by the arrow X) and in the upward direction (indicated by the arrow Z). In other words, the cam groove 19*e* is formed such that when the disk holding member 83 moves leftward (or rightward), it simultaneously moves upward (or downward). As is clear from FIGS. 9 and 10, the underside of the right rear end of the disk holding member 83 is provided with a projection 83*b* that extends downwardly, and if the right edge of this projection 83*b* is pushed by one end 70*e* (see FIG. 10) of the pivoting intermediate lever 70, the disk holding member 83 is caused to move leftward (in the direction indicated by the arrow X). It is to be noted that the disk holding member 83 is biased in the rightward direction (opposite to the direction indicated by the arrow X) typically by means the coil spring 84 shown in FIG. 9.

As already mentioned, the disk is moved by the disk moving means in the vertical direction perpendicular to the disk-carrying surface 23*a* (see FIG. 11(*b*)) of the turntable 23, and the function of the disk holding member 83 is to keep that disk parallel to the disk-carrying surface by means of the underside of said holding member which contacts the side of the disk facing said disk-carrying surface.

Turning back to FIGS. 6 and 8, a pair of sensor switches 86 and 87, the latter being positioned behind the former, are mounted on the inner surface (the left surface) of the right-hand erect portion 16*c* which is one component of the chassis 16. These switches will detect the position co which the moving body 56 has been driven by the motor 62. As is evident from FIG. 8, the sensor switches 86 and 87 are provided with actuators 86*a* and 87*a*, respectively, which project obliquely with respect to the switch bodies and are capable of swinging. A pair of rollers 88 and 89 which are movable only in the vertical direction with respect to the support body 32 fixed to the chassis 16 (i.e., in the direction indicated by the arrow Z and in the opposite direction) are engaged with these actuators 86*a* and 87*a* at their free end. As shown in FIGS. 19(*a*) and 19(*b*), each of the rollers 88 and 89 is in engagement with a projection 56*f* that has a trapezoidal cross section and which is formed on the underside of the front end of the moving body 56 in such a manner that it extends in forward and backward directions. If the moving body 56 moves a predetermined distance in either forward or backward direction, each of the rollers 88 and 89 is caused to move either upwardly or downwardly depending on the case by means of the action of the projection 56*f*, whereupon the corresponding sensor switch 86 or 87 is actuated. It should be mentioned that the rollers 88 and 89 are caused to move upwardly by the biasing force exerted on the respective actuators 86*a* and 87*a* by the bias imparting means provided within the sensor switches 86 and 87.

Detection signals issued from the sensor switches, 34, 35, 49, 86 and 87, and from the photosensor 51 are transmitted to the control unit (already described but not shown), and in response to the operation signals that are sent from the control unit in response to the detection signals, the motors 27, 45 and 62, and the turntable 23 are operated at the predetermined timings which will be described hereinafter.

Figure 24:
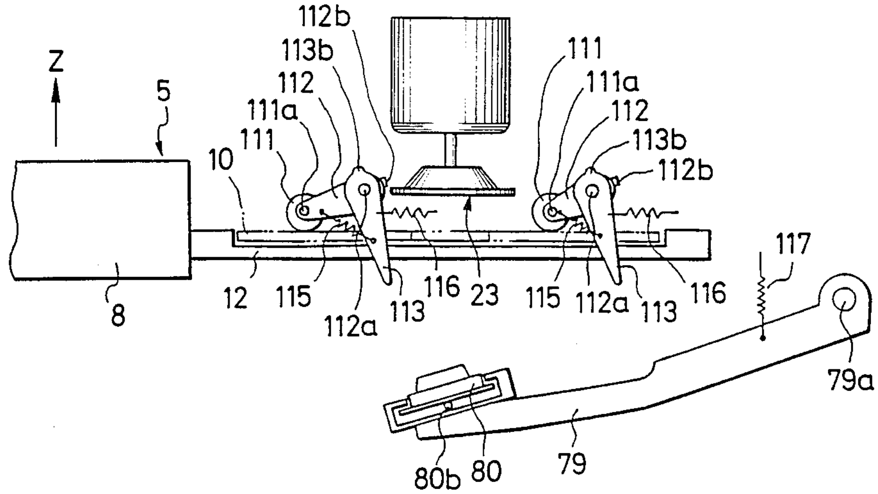

As shown in FIGS. 10 and 24, a pair of rollers 111 made of rubber are so arranged as to smoothly abut against the principal surface of the disk 10 on the tray B12 ejected out of the magazine body 8 of the magazine 5. As shown in FIG. 24, a lever member 112 is fixed to the side of each roller 111 and one end of the lever member 112 is coupled to the moving member 18 (consisting of the moving chassis A19, B20 shown in FIG. 6) in such a manner as to freely rotate about a pin 112*a*. The pin 112*a* extends in the direction perpendicular to the vertical direction (of the arrow Z and opposite thereto) and consequently the oscillation of the lever member 112 is confined to the plane including that vertical direction. Each roller 111 is rotatably fixed to the other end, i.e., the free end, of the lever member 112 through a pin 111*a*, which extends in parallel to the pin 112*a*. The lever member 112 is also fixed to the pin 112*a*.

One end of another lever member 113 is so secured to each pin 112*a* to which the lever member 112 is fixed as to freely rotate about the pin 112*a*. A boss 113*b* mating with a boss 112*b* formed at one end of the lever member 112 is formed at the one end of the lever member 113. A compressed coil spring 115 is installed between the free ends of both the lever members 112, 113 and another coil spring 116 is coupled to the free end of the lever member 113. These coil springs 115, 116 act as energizing means for energizing the rollers 111 in the direction of the principal face of the disk 10.

Each lever member 113 is coupled by a power transmission (not shown) to the second lever member 72 shown in FIG. 10 and given driving force by the above-described driving mechanism for driving the second lever member, i.e., the support 79 forming the clamp mechanism. In other words, the driving mechanism, the power transmission and the lever members 113 constitute the driving means for driving the lever members 112. Moreover, the driving means, the rollers 111, the lever members 112, the coil springs 115, 116 constitute the slip-proof means for preventing the disk 10 shifted upward (in the direction of the arrow Z) by the disk shift means (clamp mechanism) from slipping in the radial direction of the disk.

Since the driving force is given to the lever members 112 by the driving mechanism for driving the support 79 forming the clamp mechanism as set forth above, a special driving source for driving the lever members 112 only becomes unnecessary, so that the disk player as a whole can readily be made compact.

FIG. 24 shows the coil spring 117 as the energizing means for biasing the support 79 upward (in the direction of the arrow Z).

A description will subsequently be given of a lock mechanism for locking the moving member 18 (consisting of the moving chassis A19, B20 shown in FIG. 6) holding the turntable 23 to the chassis 16 (see FIG. 1) as a support while a disk is replayed.

Figure 25:
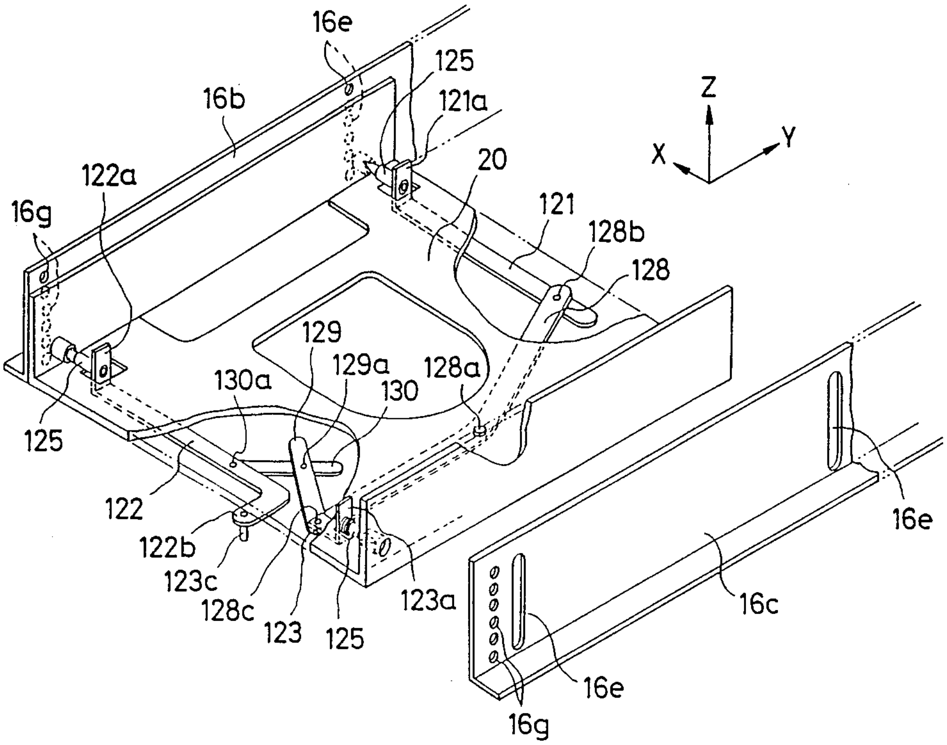

As shown in FIGS. 10 and 25, three longitudinal sliders 121, 122 and 123 extend in the transverse direction (in the directions of the arrow X and opposite thereto) on the underside of the moving chassis B20 forming the moving member 18 and are secured to the moving chassis B20 in such a manner as to reciprocate in the transverse direction. Brackets 121*a*, 122*a*, 123*a* extending upward are respectively formed at one ends of the longitudinal sliders 121 through 123 and a mating pin 125 extending in parallel to each slider is fixed to each bracket. Each of the elevational sides 16*b*, 16*c* in the transverse direction of the chassis 16 is vertically provided with six mating holes 16*g* corresponding to each mating pin 125 and, as shown in FIG. 26, the mating pin 125 can be fitted into the mating hole 16*g*.

Figure 26:
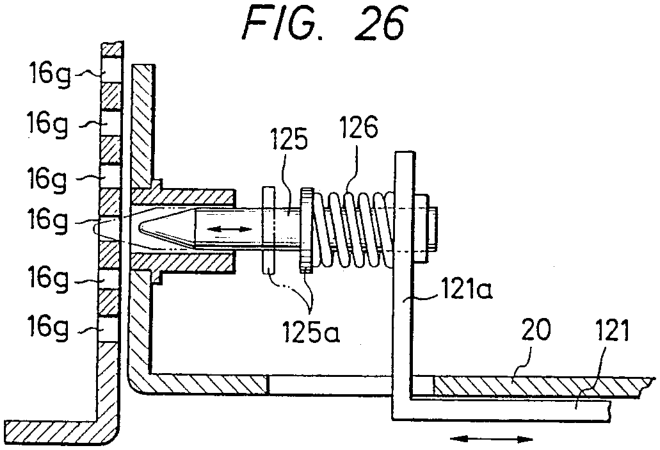
Figure 27:
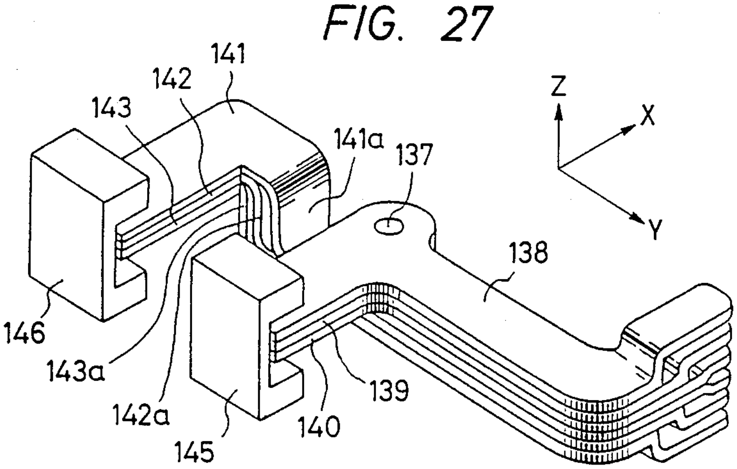

As illustrated in FIG. 26, the mating pin 125 is installed movably in the travel direction of the slider 121 (122 or 123) and a coil spring 126 as an elastic member is installed between a brim 125*a* formed roughly in the center of the mating pin 125 and the bracket 121*a* (122*a* or 123*a*) of the slider 121 (122 or 123). The coil spring 126 thus installed provides a properly strong mating force of the mating pin 125 with the mating hole 16*g*.

As shown in FIG. 25, the movements of the longitudinal sliders 121 through 123 are synchronized with each other by a synchronizing means consisting of intermediate levers 128, 129, 130 and pins 128*a*, 128*b*, 128*c*, 129*a*, 130*a*.

As shown in FIG. 10, the overhang 20*j* is protrudes at the rear end of the moving chassis B20 and one end of a relay lever 132 is attached to the overhang 20*j* in such a manner as to freely rotate about a pin 132*a*. The free end of the relay lever 132 branches off into a first branch 132*b* and a second branch 132*c*. As also shown in FIG. 25, a bracket 122*b* extending in the rear direction (in the direction opposite to the arrow Y) is formed at the right end of the slider 122 and a pin 123*c* extending downward (in the direction opposite to the arrow Z) is projected from the front end of the bracket, so that the first and second branches 132*b*, 132*c* are so positioned as to sandwich and mate with the pin 123*c*. The position of the relay lever 132 shown in FIG. 10 is called a first position, whereas its position rotated clockwise by a predetermined angle centering around the pin 132*a* is called a second position. The relay lever 132 rotates between the first and second positions. When the relay lever 132 is located in the first position, the first branch 132*b* thereof mates with the pin 123*c* of the slider 122 and, when the relay lever 132 is in the second position, the second branch 132*c* thereof mates with the pin 123*c*.

A spring member 134 as an energizing means for energizing the relay lever 132 toward the first and second positions is coupled to the first branch 132*b* of the relay lever 132. An oblong hole 132*e* is formed in the center of the first branch 132*b* and a pin 70*h* protruded from the free end 70*g* of the intermediate lever 70 is idly fitted into the oblong hole 132*e*. That is, the relay lever 132 is given rotational force by an oscillating-force application means inclusive of the intermediate lever 70.

The synchronizing means consisting of the oscillating-force application means and the intermediate lever 128, the relay lever 132 and the spring member 134 constitute the slider-driving means for driving the sliders 121 through 123. Moreover, the slider-driving means, the sliders 121 through 123, the mating pins 125 and the coil springs (FIG. 26) as elastic members constitute the lock means for locking the moving member 18 (consisting of the moving chassis A19, B20 shown in FIG. 6) to the chassis 16 as a support while the disk is not replayed.

A detection means for detecting the presence or absence of each disk within the magazine 5 will be described.

As shown in FIGS. 2(*b*) and 27, two groups of three revolving levers, i.e., six of them 138, 139, 140, 141, 142 and 143 are arranged to the right of the magazine within a plane in parallel to the principal faces of the trays 11, 12 within the magazine in such a manner as to freely revolve around a pin 137. The revolving levers are superposed on each other in the vertical direction (in the directions of the arrow Z and opposited thereto) and mate with the outer periphery of the disk 10 loaded on each of the trays 11, 12 at one end of the revolution. A photosensor 145 is installed to detect the movements of the other ends of the revolving levers 138, 139 and 140, whereas a photosensor 146 is used to detect the movements of the other ends of the revolving levers 141 through 143. The revolving levers 138 through 140 detected by the photosensor 145 are roughly plate-shaped, whereas the revolving levers 141 through 143 detected by the photosensor 146 are equipped with rising sections 141*a*, 142*a*, 143*a* rising up (in the direction of the arrow Z). Accordingly, the two photosensors 145, 146 are arranged in parallel to the principal face of each of the trays 11, 12. An energizing means installed in addition (not shown) is used to energize each of the revolving levers 138 through 143 in such a manner as to make one end thereof move close to the outer periphery of the disk 10.

The revolving levers 138 through 143 and the photosensors 145, 146 constitute the detection means for detecting the presence or absence of each disk within the magazine. In other words, the presence or absence of a disk is determined by detecting changes of the angular positions of the revolving levers 138 through 143 using the photosensors 145, 146, the changes thereof resulting from the presence or absence of the disk.

Referring to FIGS. 28 through 32, the operation of the multidisk player thus constructed will briefly be described then by reference to playback procedure.

When the disk to be played is selected by pushing one or more of the buttons shown in FIG. 1, a drive voltage is applied to the motor 45 and the moving plates 37 and 38 start to move either forwardly (in the direction indicated by the arrow Y) or backwardly (in the direction opposite to that indicated by the arrow Y). Then as a result of the action of the cam grooves 37*d* and 38*d* formed in the shape of a staircase in the moving plates 37 and 38 as combined with the action of the guide grooves 16*e* formed in the chassis 16, the pins 20*c* movably fitted in the respective grooves are caused to move upwardly or downwardly, whereupon the moving member 18 including the movable chassis B 20 on which the pins 20*c* are studded are allowed to move either upwardly or downwardly. As a consequence, the tray projecting member 53 provided on the movable member 18 reaches the position where it engages with the tray 11 or 12 carrying the disk to be played.

Detailed mechanisms for the forward and backward movements of the moving plate 37 and its positioning and, hence, the upward and downward movements of the tray projecting member 53 and its positioning, are described hereinafter.

Figure 29:
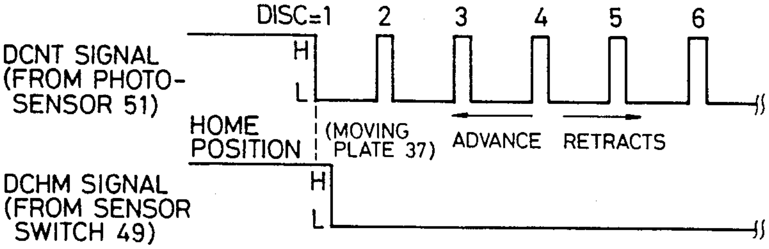
FIGS. 28 through 32 are diagrams showing a single adaptor.
Figure 28:
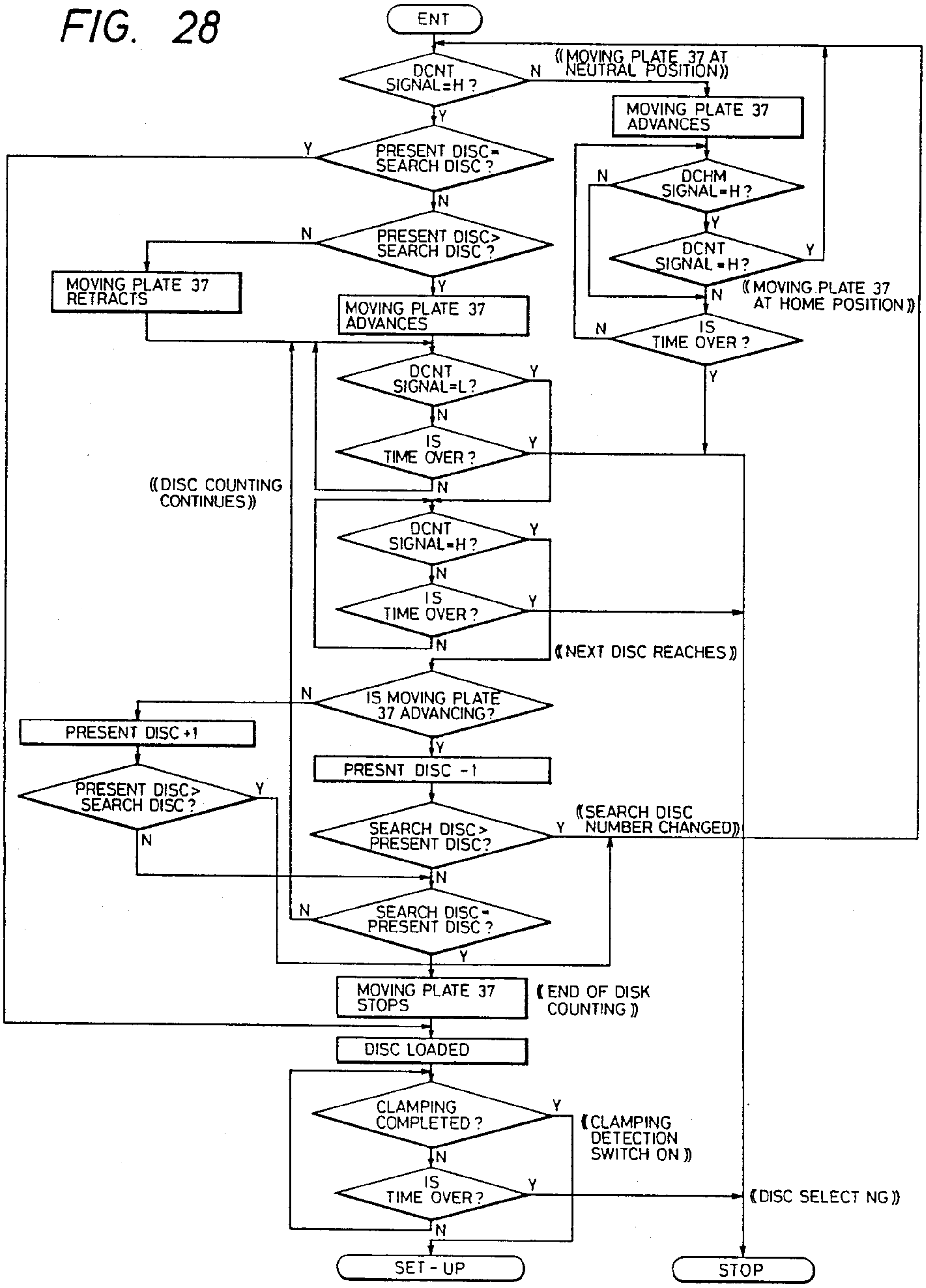
Figure 30:
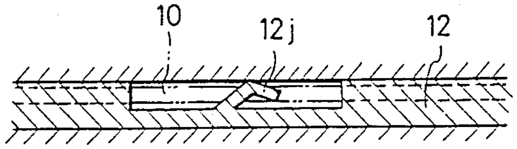

The "DCNT" signals shown in FIGS. 28 and 29 refer to the slit detection signals issued from the photosensor 51, and the "DCHM" signals refer to the detection signals issued from the sensor switch 49 for checking to see if the moving plate 37 is at its most retracted position (the position for the limit of the forward movement), or in the home position. As shown in FIG. 28, if a command signal is on while the photosensor 51 is issuing a DCNT signal, the moving plate 37 is moved by the distance corresponding to the difference between the present address (present DISC) and the desired address (search DISC). If, on the other hand, a command signal is on while no DCNT signal is being issued from the photosensor 51, the moving plate 37 continues to be retracted (moved forwardly) until a DCHM signal is issued from the sensor switch 49, and thereafter the plate is moved to the position of the desired address (search DISC).

When the tray projecting member 53 is brought to the position where, by the procedures described above, it engages with the tray carrying the disk to be played, the motor then starts to rotate to drive the moving body 56 in the backward direction (opposite to the direction indicated by the arrow Y). As a result, the intermediate lever 70 is caused to pivot in the counterclockwise direction with reference to FIG. 10 and the second lever member 72 connected to the intermediate lever 70 is caused to move rightward (in the direction opposite to the direction indicated by the arrow X). As shown in FIG. 20, the second lever member 72 is locked to the first lever member 71 by means of the lock/unlock mechanism including the movable slider 76. Consequently, both the first lever member 71 and the second lever member 72 are caused to move rightward, causing the tray projecting member 53 to pivot in the clockwise direction with reference to FIG. 10. Therefore, as shown in FIG. 2(*b*), the tray (e.g., tray B 12) carrying the disk to be played is caused to project from the magazine body 8 and the disk is caused to move to a position which is concentric with, namely, right under, the disk-carrying surface 23*a* of the turntable 23 (FIG. 11(*b*)). It should be noted that immediately before the pivoting of the tray projecting member 53 and, hence, the rightward movement of the first lever member 71, is completed, the first lever member 71 is unlocked from the second lever member 72, and a subsequent slight movement of the first lever member 71 in the rightward direction is effected by the biasing force of the coil spring 75 (FIG. 20). Thus, the arched portion 12m of the tray B 12 (see FIG. 2(*b*)) that is being pressed by the urging force is brought into contact with the predetermined arched contact portion 19*c* of the movable chassis A 19. These procedures will complete the positioning of the tray B 12. The fact that the tray has been projected from the magazine body 8 is detected by sensing a detection signal issuing from the sensor switch 87 (see FIG. 8 and other drawings) that is actuated by the movement of the moving body 56. Moreover, the flexible slip-proof projection 12*j* formed on the tray B12 is kept in a state shown in FIG. 30 before the tray is ejected from the magazine body 8.

The second lever member 72 that has been unlocked from the first lever member 71 is further driven in the rightward direction (opposite to the direction indicated by the arrow X), and the support 79 (FIG. 10) that is engaged with the tapered portion 72*f* (FIG. 20) of the second lever member by means of the pin 79*c* is caused to swing upwardly (in the direction indicated by the arrow Z). Consequently, the disk is lifted up and clamped onto the turntable 23 (the state shown in FIG. 31). The upward movement of the disk is shown as DISK LOAD in FIG. 28. As the disk moves up, a disk press member 83 is also moved up together with the disk by the intermediate lever 70. Notwithstanding, the disk press member 83 is slightly separated from the disk when the disk has been loaded on the turntable completely, whereby the rotation cf the disk is not obstructed by the disk press member.

Figure 31:
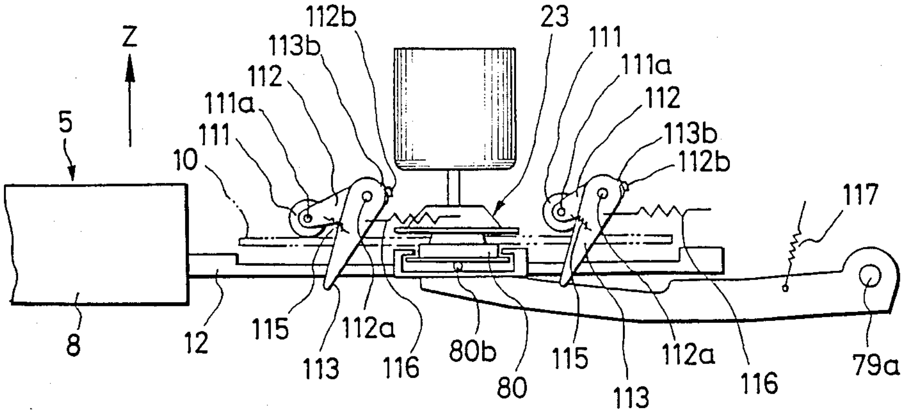

The operation of the rollers 111 and the lever members 112 shown in FIGS. 24, 31 will be described in detail.

When the tray B12 is ejected from the magazine body 8, the rollers 111 rotate while abutting against the principal face of the disk 10 on the tray by means of the energizing force of the coil springs 115, 116. When the tray B12 is completely ejected, the disk 10 is located right under the turntable 23. Then the disk is moved up by the clamp mechanism as described above and, since the lever member I12 abutting against the principal face of the disk. Simultaneously with the clamping of the disk, the other lever member 113 rotates clockwise as shown in FIG. 31 and the boss 113*b* formed on the lever member is caused to mate with the boss 112*b*, so that the lever member 112 is also rotated clockwise by a predetermined angle. In consequence, the roller 111 is separated from the principal face of the disk 10. As described above, the oscillation of the lever member 113 is carried out by the movement of the second lever member 72 (see FIG. 10).

Figure 32:
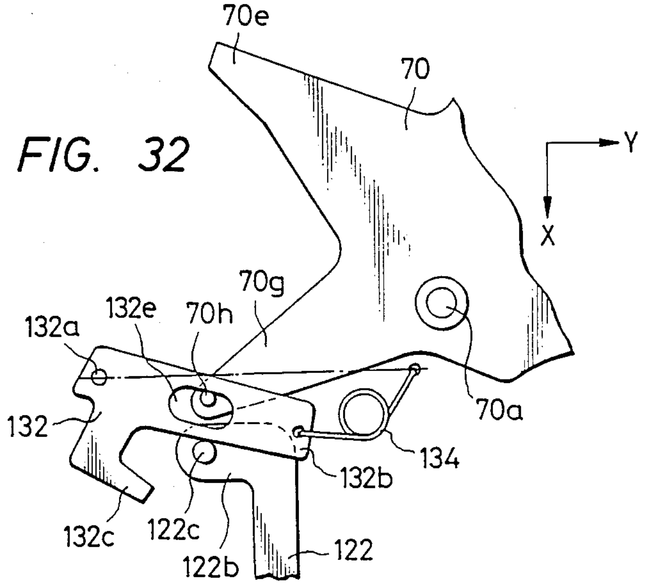

As shown in FIG. 32, on the other hand, the relay lever 132 is rotated counterclockwise by the predetermined angle in FIG. 32 as the intermediate lever 70 revolves. The rotation of the relay lever 132 is triggered by the revolution of the intermediate lever during the initial period only and then by the energizing force of the spring member 134. As the relay lever 132 rotates, the first branch 132*b* of the relay lever 132 rotates, the first branch 132*b* of the relay lever mates with the pin 122*c* of the slider 122 and presses the slider to the left (in the direction of the arrow X). Consequently, the the other sliders 121, 123 (FIG. 25) are also moved. The mating pin 125 formed at the end of each slider is fitted into the mating hole 16*g* (FIG. 25) formed in the chassis as a support, whereby the whole body of the moving member 18 including the moving chassis B20 is locked to the chassis 16.

The above procedures render the system ready for play and the turntable 23 and the carriage 24 (see FIG.

9 and other drawings) are operated to start the playing of the desired disk.

When the playing of the desired disk ends, the disk is reloaded into the magazine body 8. This may be done by reversing the above-described disk loading sequence and, therefore, it will not be necessary to describe the re-loading sequence in detail. The procedures described in the preceding paragraphs may be repeated as many times as the number of the pieces of music the listener wants to play.

The magazine 5 is ejected from the player by depressing the "EJECT" button in the group of control buttons 6. When the "EJECT" button is depressed, the moving body 56 (see, for example, FIG. 19) is caused to move forward (in the direction indicated by the arrow Y) by a predetermined distance, whereupon the magazine 5 is released from the state of being locked by the locking member 67. Thereafter, the moving body 56 is caused to move further in the forward direction, whereby the swinging lever 64 shown in FIG. 10 is caused to swing about the pin 64*a* and the magazine 5 engaging with the free end of the lever is pushed out of the player.

As set forth above, the multidisk player according to the present invention comprises the press member 80 for performing a disk clamp action in cooperation with the turntable by abutting against a face of the disk, the face being opposite to what faces the turntable, and the press member is provided with the projection for being fitted into the center hole of the disk.

In consequence, the disk is prevented from slipping in the radial direction even if some external force is applied to the disk player while the disk is being shifted and can thus be shifted stably. The multidisk player according to the present invention is accordingly suitable for use in, e.g., a vehicle because it is free from a miss clamp.

Since the multidisk player according to the present invention can be so constructed without increasing the number of parts, it can be made smaller in size and less costly.

What is claimed is:

1. A disk player including a player housing, a turntable with a downwardly facing disk receiving surface installed in said player housing, a disk holder for holding a plurality of plate-shaped trays projectable from said holder and retractable into said holder along a principal surface of said tray, each trayholding a disk on its principal surface and said holder being detachably mounted at a predetermined position within said player housing with said disk being held generally horizontally, and a disk-unloading/conveying mechanism comprising a moving member movable in stack direction substantially transverse to the principal surfaces of said trays, tray drive means arranged on said moving member for selectively engaging one of said trays and for projecting said selected tray from said holder, positioning means for positioning said moving member so that said tray drive means selects a desired tray, and disk transport means for separating the disk from the desired tray projected from said holder and for carrying the separated disk to said turntable, wherein said transport means and said tray drive means are carried on said moving member and said moving member causes said turntable, said tray drive means and said transport means to move to a position at which said desired tray when projected from said holder confronts said turntable and thereafter said transport means separates said disk from said tray and conveys it to said turntable, characterized in that said transport means comprises:
   a press member for performing a disk clamping action in an upper direction in cooperation with said turntable by abutting against a face of said disk, said face being opposite to a face of said disk facing said turntable, said press member being provided with a projection projecting in said upper direction for being fitted into the center hole of said disk.

2. A disk player as recited in claim 1, wherein said turntable has a downwardly facing recess for receiving said projection of said press member.

3. A disk player as recited in claim 2, wherein said projection and said recess have respective portions facing each other and being inclined substantially in parallel to each other with respect to said upper direction.

4. A disk player including a player housing, a turntable with a downwardly facing disk receiving surface installed in said player housing, a disk holder for holding at least one disk and for being inserted and installed in installation means within said player housing with said disk being held generally horizontally, and a disk-unloading/conveying mechanism for conveying said disk in said holder to a playback position, characterized in that said disk holder comprises:
   a holder housing,
   at least one plate-shaped tray that can be contained in said holder housing and ejected from said holder housing in parallel to a principal surface of said tray,
   a press member for performing a disk clamping action in an upper direction in cooperation with said turntable by abutting against a face of said disk, said face being opposite to a face of said disk facing said turntable, said press member being provided with a projection projecting in said upper direction for being fitted into the center hole of said disk,
   a disk holding member movable in said upper direction in cooperation with said disk-unloading/conveying mechanism conveying said disk to said playback position, said disk holding member contacting said face of said disk facing said turntable for keeping said disk parallel to said disk receiving surface of said turntable.

* * * * *